(12) United States Patent
Takagi

(10) Patent No.: US 8,090,895 B2
(45) Date of Patent: Jan. 3, 2012

(54) INFORMATION PROCESSING SYSTEM, INFORMATION PROCESSING DEVICE, CONTROL METHOD FOR INFORMATION PROCESSING DEVICE, AND COMPUTER-READABLE RECORDING MEDIUM

(75) Inventor: Yuzo Takagi, Bunkyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/137,122

(22) Filed: Jul. 21, 2011

(65) Prior Publication Data

US 2011/0283038 A1 Nov. 17, 2011

Related U.S. Application Data

(63) Continuation of application No. PCT/JP2009/051609, filed on Jan. 30, 2009.

(51) Int. Cl.
*G06F 13/00* (2006.01)
*G06F 13/42* (2006.01)

(52) U.S. Cl. ........ 710/317; 710/104; 710/106; 710/242; 710/316

(58) Field of Classification Search ................. 710/104, 710/106, 242, 316, 317
See application file for complete search history.

(56) References Cited

U.S. PATENT DOCUMENTS

| | | | |
|---|---|---|---|
| 5,701,416 A * | 12/1997 | Thorson et al. | 712/11 |
| 5,892,923 A * | 4/1999 | Yasuda et al. | 709/239 |
| 6,633,580 B1 * | 10/2003 | Tørudbakken et al. | 370/461 |
| 6,674,720 B1 * | 1/2004 | Passint et al. | 370/235 |
| 6,751,698 B1 * | 6/2004 | Deneroff et al. | 710/317 |
| 6,912,612 B2 * | 6/2005 | Kapur et al. | 710/309 |

FOREIGN PATENT DOCUMENTS

| | | |
|---|---|---|
| JP | 1-241660 | 9/1989 |
| JP | 6-26684 | 2/1994 |
| JP | 7-191947 | 7/1995 |
| JP | 8-185380 | 7/1996 |
| JP | 10-21208 | 1/1998 |
| JP | 10-506736 | 6/1998 |
| JP | 2004-527176 | 9/2004 |
| WO | WO 02/084508 A1 | 10/2002 |

OTHER PUBLICATIONS

International Search Report for PCT/JP2009/051609, Mailed Mar. 10, 2009.
Dennis Abts et al., "Age-Based Packet Arbitration in Large-Radix k-ary n-cubes", SC07, 2007, 11pg.
V. Ahuja, "Routing and flow control in Systems Network Architecture", IBM System Journal, vol. 18, No. 2, 1979, pp. 298-314.

* cited by examiner

*Primary Examiner* — Mark Rinehart
*Assistant Examiner* — Jeremy S Cerullo
(74) *Attorney, Agent, or Firm* — Staas & Halsey LLP

(57) ABSTRACT

An information processing system including plural information processing devices multi-dimensionally connected with one another, where each of the information processing devices includes first and second receiving storage devices to store data allocated to first and second virtual channels in respective data transmitting and receiving directions, a virtual channel control unit to compare a position in a dimension of a destination information processing device with a position in the same dimension of an own information processing device, and if the comparison result indicates that the position of the own information processing device matches a position one information processing device before the position of the destination information processing device, change one of the first and the second virtual channels to the other one, and a data storage unit to store the allocated data in a corresponding one of the first and second storage devices.

12 Claims, 16 Drawing Sheets

INFORMATION PROCESSING SYSTEM, INFORMATION PROCESSING DEVICE, CONTROL METHOD FOR INFORMATION PROCESSING DEVICE, AND COMPUTER-READABLE RECORDING MEDIUM

CROSS-REFERENCE TO RELATED APPLICATIONS

The present application is a U.S. continuation application filed under 35 USC 111(a) claiming benefit under 35 U.S.C. 120 and 365(c) of PCT International Application No. PCT/JP2009/051609 filed on Jan. 30, 2009, the entire contents of which are incorporated herein by reference.

FIELD

A certain aspect of the embodiments discussed herein is related to an information processing system such as an information processing system including a plurality of information processing devices that are multi-dimensionally connected with one another, the information processing device, a control method for the information processing device, a control program for the information processing device and a computer-readable recording medium storing such a control program.

BACKGROUND

An information processing system having numerous information processing devices that are multi-dimensionally connected with one another is called a parallel computer system. One of the most ideal networks for connecting numerous information processing devices in the parallel computer system may be a full connection system in which each information processing device is connected to all the other information processing devices on a one-to-one basis. However, in such a full connection system, cost of cables utilized for connecting the information processing devices is increased, and a problem concerning the complexity of cable interconnection may be expected. Thus, it may be difficult to apply the full connection system to the network system having numerous information processing devices.

A widely used system alternative to the full connection system may be a system formed by utilizing a topology such as multidimensional torus or multidimensional mesh. Such a system utilizing the multidimensional torus topology or multidimensional mesh topology may be implemented by connecting only a few information processing devices to one information processing device on the one-to-one basis. As a result, all the information processing devices included in the network system are connected with one another. With such a network system, any of the information processing devices may eventually be accessible to all the other information processing devices included in the network system by connecting the information processing devices via other information processing devices. That is, any of the information processing devices may, in principle, be accessible to any other of the information processing devices in the network system.

However, in the network system utilizing the multidimensional torus or multidimensional mesh topology, not all the information processing devices are mutually connected on the one-to-one basis. Thus, the following problems may be of concern. That is, there is only one shortest path for transferring data from a certain information processing device to another information processing device in the full connection system; however, there are plural shortest paths for transferring data between the information processing devices in the network system utilizing the multidimensional torus or multidimensional mesh topology. Thus, a routing algorithm for selecting one of the shortest paths may be required.

[Patent Document 1] Japanese Laid-open Patent Publication No. 2004-527176
[Patent Document 2] Japanese Laid-open Patent Publication No. 08-185380
[Patent Document 3] Japanese Laid-open Patent Publication No. 07-191947
[Patent Document 4] Japanese Laid-open Patent Publication No. 06-266684
[Patent Document 5] Japanese Laid-open Patent Publication No. 10-021208
[Patent Document 6] U.S. Pat. No. 6,674,720
[Non-Patent Document 1] "Age-based packet arbitration in large radix k-ary and n-cubes", Denis Abts and Deborah Weisser, SC07, 2007
[Non-Patent Document 2] "Routing and flow control in systems network algorithm", V. Ahuja, IBM Journal, 1978
[Non-Patent Document 3] "Flexible oblivious router algorithm", U. Par et. al., IBM Journal, 1995
[Non-Patent Document 4] "Computer Architecture A Quantitive Approach Fourth Edition", John L. Hennessy and David A. Patterson, SHOEISHA Co., Ltd., Appendix E, E-3 p. 22—Overview, E-4 p. 30—Topology related section, E-5 p. 45—Routing related section, E-6 p. 57—switch micro-architecture related section

SUMMARY

According to an aspect of the embodiment, there is provided an information processing system that includes a plurality of information processing devices multi-dimensionally connected with one another. In the information processing system, each of the information processing devices includes a first receiving storage device configured to store data allocated to a first virtual channel and a second receiving storage device configured to store data allocated to a second virtual channel in corresponding data transmitting and receiving directions; a virtual channel control unit configured to compare a position of a destination information processing device in a dimension in which data is transmitted with a position of an own information processing device in the same dimension, and if the own information processing device is positioned one information processing device before the position of the destination information processing device, change one of the first and the second virtual channels allocated to the corresponding data to the other one of the first and the second virtual channels; a data storage unit configured to store the corresponding data allocated to the one of the first and the second virtual channels controlled by the virtual channel control unit in one of the first and second storage devices based on the controlled one of the first and the second virtual channels; a transmitting dimension control unit configured to compare the position of the destination information processing device in a dimension in which data is transmitted with the position of the own information processing device in the same dimension, and if the position of the own information processing device matches the position of the destination information processing device, change the dimension in which the corresponding data are transmitted into the other dimension; and an arbitration unit configured to perform arbitration between a unit of data stored in the first storage device and a unit of data stored in the second storage device, and determine one of the units of the data to be transmitted in a corresponding one of directions as data to practically be transmitted.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENT(S)

Figure 1:
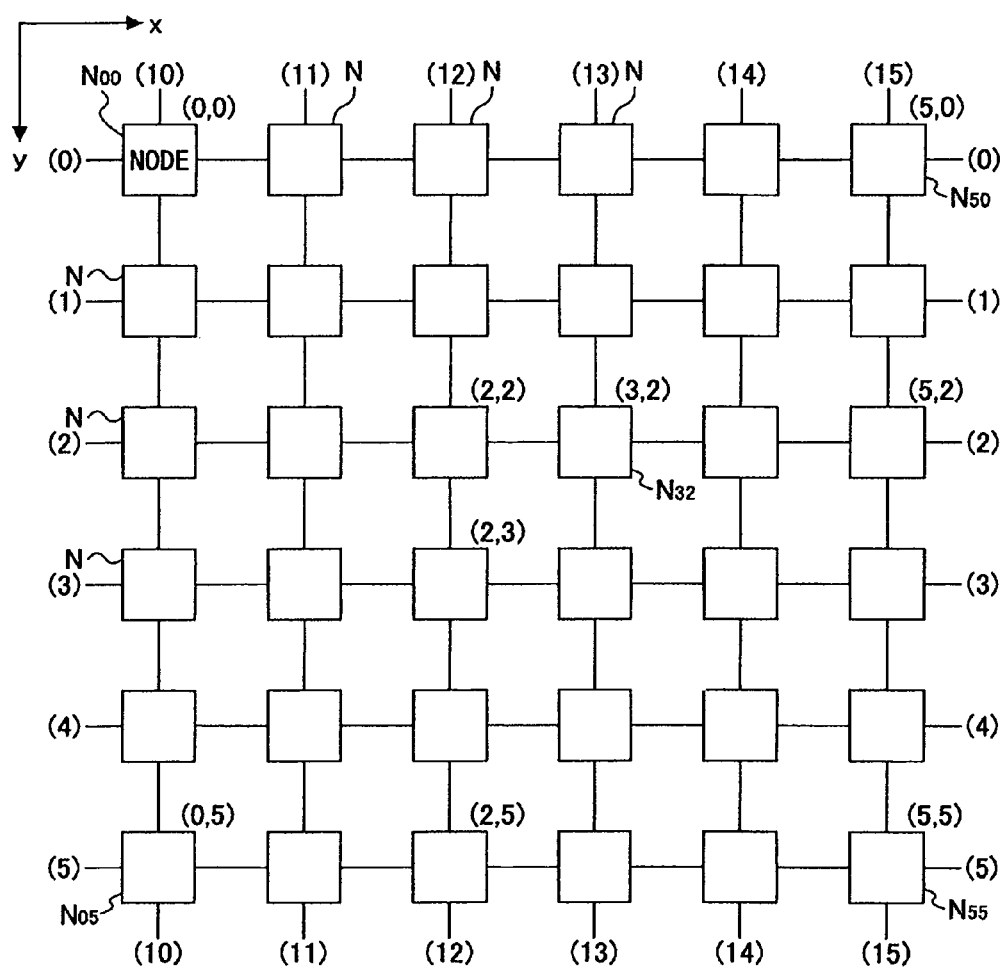
FIG. 1 is a block diagram illustrating an overall configuration example of an information processing system according to a first embodiment.

FIG. 1 is a block diagram illustrating an overall configuration example of an information processing system according to a first embodiment. In FIG. 1, the information processing system includes a topology where nodes N are connected in a two-dimensional torus configuration. That is, in FIG. 1, the nodes are mutually connected between left and right ends of the same rows (0), (1), ..., and (5). Similarly, in FIG. 11, the nodes are mutually connected between upper and lower ends of the same columns (10), (11), ..., and (15). As a result, the nodes are connected in the two-dimensional torus configuration.

Note that the respective nodes N indicate the information processing devices. In the configuration example of FIG. 1, six nodes N are arranged along +/−x directions (horizontal directions in FIG. 1), and six nodes N are arranged along +/−y directions (vertical directions in FIG. 1), which amounts to 36 nodes N. Note that in FIG. 1, the right direction indicates +x direction and a downward direction indicates +y direction. The adjacent nodes N arranged in +/−x directions and +/−y directions are connected via physical channels. The physical channels are bidirectional channels. As illustrated in FIG. 1, among 36 nodes N, the node $N_{00}$ (i.e., node $N_{00}$ at an upper left corner in FIG. 1) located at a corner in −x direction and −y direction has coordinates of an origin (0,0). Similarly, the node $N_{55}$ (i.e., node $N_{55}$ at a lower right corner in FIG. 1) located at a corner in +x direction and +y direction has coordinates of (5, 5). Similarly, the node $N_{50}$ (i.e., node $N_{50}$ at an upper right corner in FIG. 1) located at a corner in +x direction and −y direction has coordinates of (5, 0). Similarly, the node $N_{05}$ (i.e., node $N_{05}$ at a lower left corner in FIG. 1) located at a corner in −x direction and +y direction has coordinates of (0, 5). That is, the node N located at nth column in +x direction and at mth row in +y direction with respect to the Node N located at the origin has coordinates of (n, m). For example, the node N located at the third column in +x direction and at the second row in +y direction with respect to the Node $N_{00}$ located at the origin has coordinates of (3, 2). Note that in FIG. 1, coordinates of each selected nodes are illustrated at an upper right corner of an outline of a square that represents the node.

Figure 2:
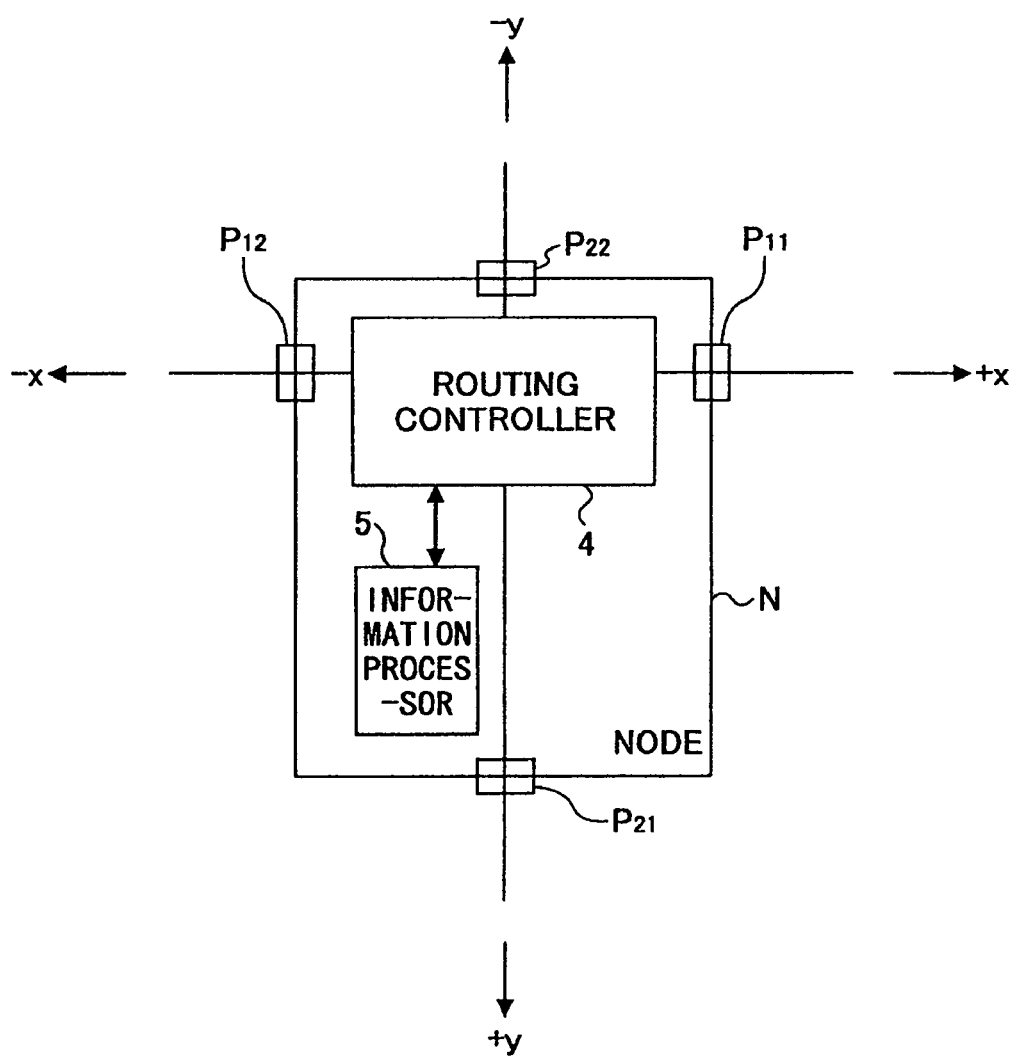
FIG. 2 is a block diagram illustrating an internal configuration example of one of information processing devices in FIG. 1.

FIG. 2 is a block diagram illustrating an internal configuration example of the node N. As illustrated in FIG. 2, the node N includes a routing controller 4 and an information processor 5. The routing controller 4 controls the dimensions and the virtual channel of a data packet generated by the information processor 5 or a data packet transferred from an adjacent node. The dimension control and the virtual channel control are described later. Note that the physical channel connected between the nodes is connected to the routing controller inside the node N. Further, the information processor 5 that includes a central processing unit (CPU) is described later with reference to FIG. 15.

The routing controller 4 implements a routing system, a so-called "dimension order routing". In the following, the dimension order routing is described. An information processing system including plural information processing devices that are multi-dimensionally connected, that is, the information processing system having the nodes N that are two-dimensionally connected is given as an example as illustrated in FIG. 1. The dimension order routing is defined as an algorithm for use in the information processing system having multi-dimensionally connected nodes, according to which coordinates of a destination node are determined by regularly matching one dimension and then a subsequent dimension of the destination node in a sequential order. The sequential order complied with the above rule may be the order of x dimension and y dimension in the information processing system having the nodes connected in the two-dimensional torus configuration. Herein, the information processing system having the information processing devices connected in the two-dimensional torus configuration in which a start point of the node to transfer a data packet has coordinates of information source (0, 0) and an end point of the node to receive the data packet has coordinates of information destination node (2, 1) is given as an example. In this example, the data packet is transferred in the order of coordinates (0, 0)→(1, 0)→(2, 0)→(2, 1).

Specifically, the data packet is first transferred to the nodes arranged along the x axis. Here, the data packet is sequentially transferred to the nodes along the x axis until a value of the x axis of the node that holds the data packet matches a value of the x axis of the destination node. If the value of the x axis of the node that holds the data packet matches the value of the x axis of the destination node, the node having the matched x axis value transfers the data packet in a y-axis direction. The data packet is then transferred to the nodes arranged in the y-axis direction. Here, the data packet is sequentially transferred to the nodes in the y axis until a value of the y axis of the node that holds the data packet matches a value of the y axis of the destination node. That is, the data packet is sequentially transferred to the nodes in a certain dimension until a position of the node that holds the data packet matches a position of the destination node. Next, the dimension to which the data packet is transferred is transitioned to a subsequent dimension, and the data packet is sequentially transferred to the nodes in the changed dimension until a position of the node that holds the data packet matches a position of the destination node in the same dimension. With this procedure, the position of the node that holds the data packet sequentially matches the position of the destination node in respective dimensions. Eventually, the position of the node that holds the data packet matches the position of the destination node in all dimensions. That is, the data packet reaches the destination node.

The advantage of the routing algorithm may be to provide deadlock-free properties where the deadlock caused by a cyclic loop structure of a data transfer path is theoretically prevented from occurring by incorporating a dateline factor in the routing algorithm.

Note that $P_{11}$, $P_{12}$, $P_{21}$, and $P_{22}$ in FIG. 2 indicate respective transmitting-receiving ports descried later.

Figure 3:
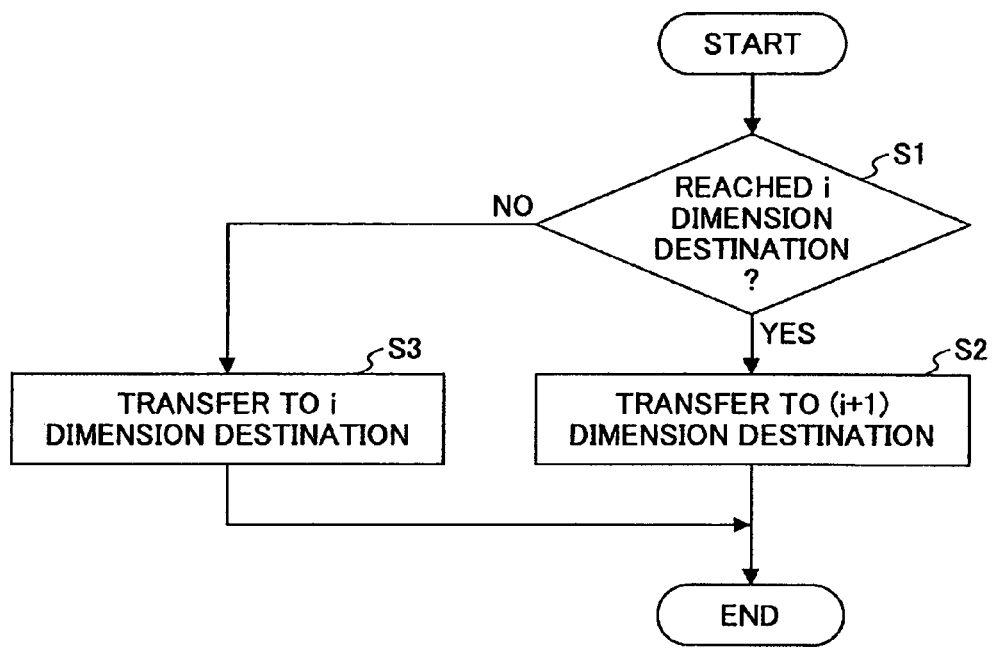
FIG. 3 is a process flowchart illustrating a dimension order control method utilizing a dimension order routing system implemented by a routing controller in FIG. 2.

FIG. 3 is a flowchart illustrating a dimension control method for implementing dimension order routing with the information processing system according to the first embodiment. In FIG. 3, in a case where a data packet is transferred in an i dimension in step 1, the node having received the data packet from an adjacent node determines whether the data packet has reached the i dimension position of the destination node. If a node other than the destination node located at the i dimension has received the data packet, the node having received the data packet transfers the received data packet to the dimension identical to the dimension in which the node has received the data packet. That is, in this case, if the data packet is transferred along the x axis, the dimension in which the node having received the data packet transmits the received data packet is continuously the x axis. In step S1, each node reads the x axis position of the destination node from a header of the received data packet. Note that a configuration example of the data packet is described later with reference to FIG. 11. The node then compares the read x axis position of the destination node with the x axis position of the own node. If the x axis position of the destination node in the received data packet matches the x axis position of the own node (YES in step S1), the comparison result indicates that the data packet has already reached the destination node position in the x axis at this moment. Accordingly, since the data packet has reached a subsequent dimension, that is, an (i+1) dimension such as a y axis of a destination node, a dimension to which the data packet is transferred is the (i+1) dimension, that is, the y axis (step S2). On the other hand, if the determination result in step S1 is "NO", the data packet has not reached the destination node position of the x axis. Accordingly, the node having received the data packet continuously retains the x axis as the dimension in which the data packet is transferred so that the data packet reaches the destination of the x axis (step S3).

Note that the algorithm of the dimension order routing has the above described deadlock-free advantage; however, it may still need examining in terms of communication efficiency. That is, if the dimension order routing is applied to the system, a linear type communication mode, in which the data packet is linearly transferred in an axis such as the x axis or y axis in practical operations as described in the above examples, may be changed into a transition type communication mode, in which the data packet is transferred from the x axis to the y axis. As a result, the usage of the buffer that temporarily stores the received data packet may not be uniform between the nodes; or transferring the data packet in the transition type communication mode, which is less utilized than the linear type communication mode, may inhibit transferring the data packet in the linear communication mode. The information processing system according to the first embodiment employs the dimension order routing having the deadlock-free properties and improves the communication efficiency in the entire system.

Figure 4:
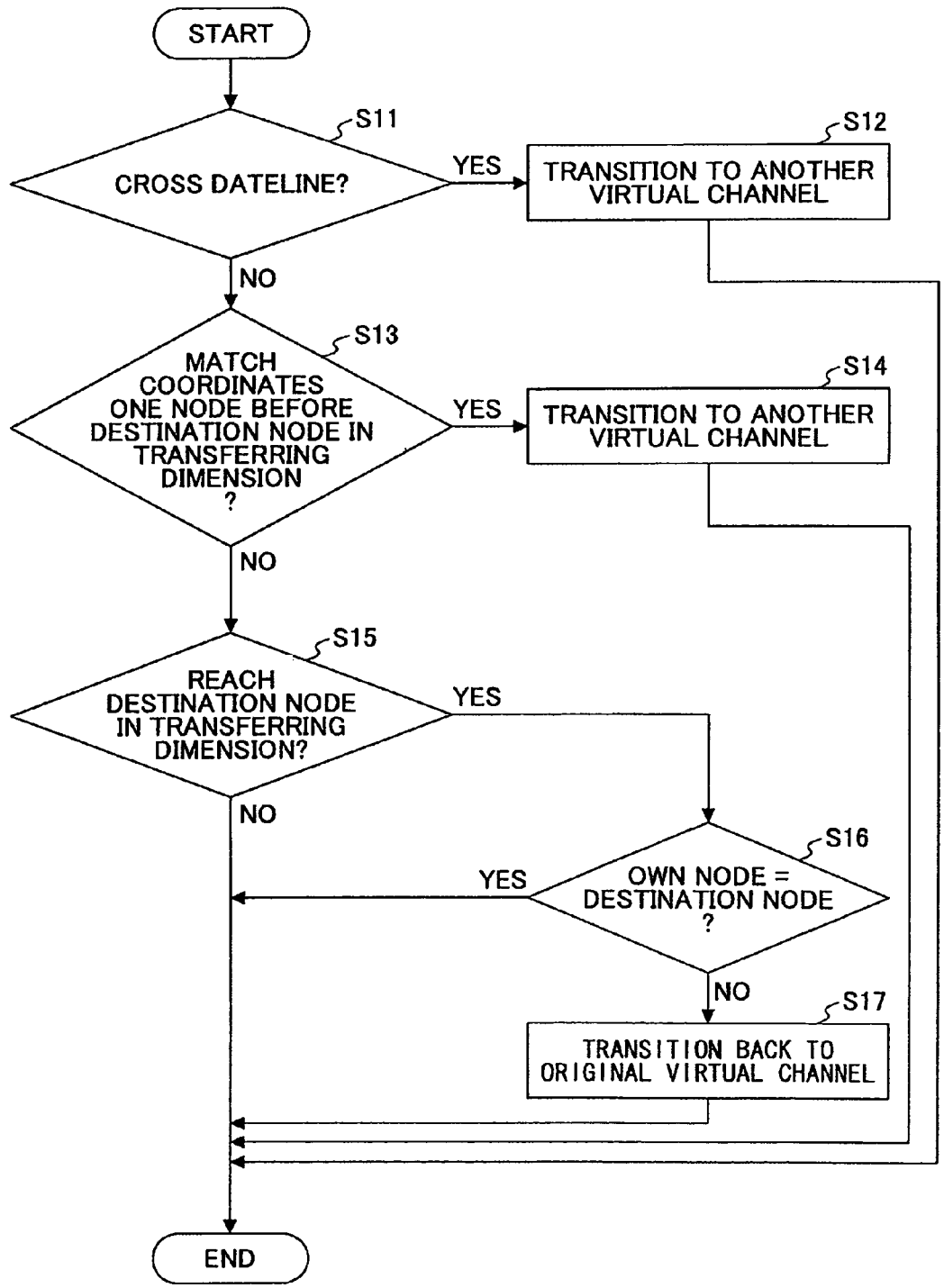
FIG. 4 is a process flowchart illustrating a virtual channel control method implemented by the routing controller in FIG. 2.

FIG. 4 is a flowchart illustrating a virtual channel control method according to the first embodiment.

In FIG. 4, when the node transmits the data packet, the node determines whether the transmission of the data packet crosses a dateline (step S11). Note that the dateline is specified for each dimension and provided at intervals between the predetermined nodes for the corresponding dimension. In a case of FIG. 1, the intervals between predetermined nodes indicate portions connecting adjacent nodes via which the left end and right end nodes are eventually connected in the corresponding row (0), (1), . . . , or (5). Similarly, the intervals between predetermined nodes also indicate portions connecting adjacent nodes via which the upper end and lower end nodes are eventually connected in the corresponding column (10), (11), (12) . . . , or (15). As illustrated in the information processing system in FIG. 1, the datelines are provided for implementing the deadlock-free dimension order routing in the information processing system having nodes mutually connected in a torus configuration. That is, if a path in which the data packet is transferred is less likely to change its dimensions, the deadlock may occur while the data packets are transferred in the same dimension of the path. The dateline is provided for generating a change in a virtual channel while the data packets are transferred in the same dimension of the path if the path in which the data packets are transferred is less likely to change its dimensions. As a result, the deadlock-free dimension order routing may be implemented.

Herein, a description of the virtual channel is given. In the information processing system having the nodes connected in a torus configuration in FIG. 1, the interval between the nodes is physically connected with one channel. In the information processing system according to the first embodiment, each of the nodes has plural buffers to which respective virtual channels are allocated. As a result, the effect is similar to that obtained in the system where the nodes are connected by the channels the number of which equals to the number of the buffers.

The deadlock is described below. As illustrated in FIG. 1, when the data packets are transferred in the information processing system having the nodes connected in a torus configuration, specific plural nodes may form a loop structure. When the specific plural nodes form a loop structure, the data packets may be stored in all the buffers provided in one virtual channel contained in the nodes, and hence, there may be little space left in the buffers. In a case where all the buffers in one virtual channel of a node are filled with the data packets and have little space, buffers provided in one virtual channel of a corresponding counterpart node to which the node transfers the data packets may have little space. Accordingly, the node may not transfer the data packets stored in its virtual channel to the counterpart node. This phenomenon is called the deadlock. The virtual channel may be changed by a dateline function to cause the data packet to cross the dateline while transferring the data packet in the same dimension. By the change of the virtual channel, buffers for different virtual channels of the node in the loop structure may be used instead of the other buffers already filled with the packets. Thus, if the buffers for the channel differing from those having little space are used, those differing from those having little space have sufficient space. Thus, the node may be able to transfer the data packets to the space of the buffers of the counterpart node. Accordingly, the deadlock may not occur.

Referring back to FIG. 4, in step S11, when the node receives the data packet, whether the node having received the data packet is located adjacent to the dateline and whether the node having received the data packet is located in a direction where the transmitting data packet crosses the dateline are determined. When the node having received the data packet is located adjacent to the dateline and the node is to transmit the data packet in a direction where the transmitting data packet crosses the dateline, a determination result in step S11 is "YES". If the determination result in step S11 is "YES", a current virtual channel allocated to the data packet is made to transition to another virtual channel (step S12). For example, one virtual channel allocated to the data packet is made to transition to another one. Note that the transition of the virtual channel may be implemented by overwriting virtual channel information VC (will be described later with reference to FIG. 11) contained in a header of the data packet with other virtual channel information. When the virtual channel information VC of the header is overwritten with the new one, the counterpart node that has received the data packet performs the following operations. When the virtual channel information VC contained in the header is overwritten with the other virtual channel information, the counterpart node that has received the data packet performs the following operations.

If the determination result in step S11 is "NO", the process of the counterpart node is moved to the process in step S13. In step S13, whether the coordinates of the own node in the dimension in which the data packet is transferred match coordinates one node before the destination node in the same dimension in which the data packet is transmitted is determined. If the determination result indicates that the coordinates of the own node match the coordinates one node before the destination node ("YES" in step S11), the virtual channel allocated to the data packet is transitioned to another virtual channel (step S14). For example, the data packet in one virtual channel is transitioned to another one.

If the determination result in step S13 is "NO", the process of the counterpart node moves to the process in step S15. In step S15, whether the coordinates of the own node in a dimension in which the data packet is transferred match the coordinates of the destination node in the same dimension in which the data packet is transmitted is determined. If the determination result indicates that the coordinates of the own node match the coordinates of the destination node ("YES" in step S15), whether the own node is a final destination to which the data packet is addressed is determined (step S16). If the determination result indicates that the own node is the final destination to which the data packet is addressed ("YES" in step S16), the processes of FIG. 4 are ended (step S17). If, on the other hand, the determination result indicates that the own node is not the final destination to which the data packet is addressed ("NO" in step S16), and the virtual channel allocated to the data packet has already been transitioned to another virtual channel in step S11 or S13, the original virtual channel allocated to the data packet before the transition of the virtual channel is reallocated to the data packet (step S17). For example, one virtual channel allocated to the data packet is transitioned back to the original one. If the virtual channel allocated to the data packet has not been transitioned to another virtual channel in step S11 or S13, step S17 is not carried out for allocation or reallocation of the virtual channel.

Hereinafter, the virtual channel control method illustrated with reference to FIG. 4 is more specifically described with reference to FIGS. 5 to 7.

As illustrated above, the respective nodes each include plural buffers for implementing the virtual channel control method. Plural transmitting-receiving ports having such a structure are provided. The configuration of the node N to which the virtual control method is applied is described with reference to FIG. 5.

Figure 5:
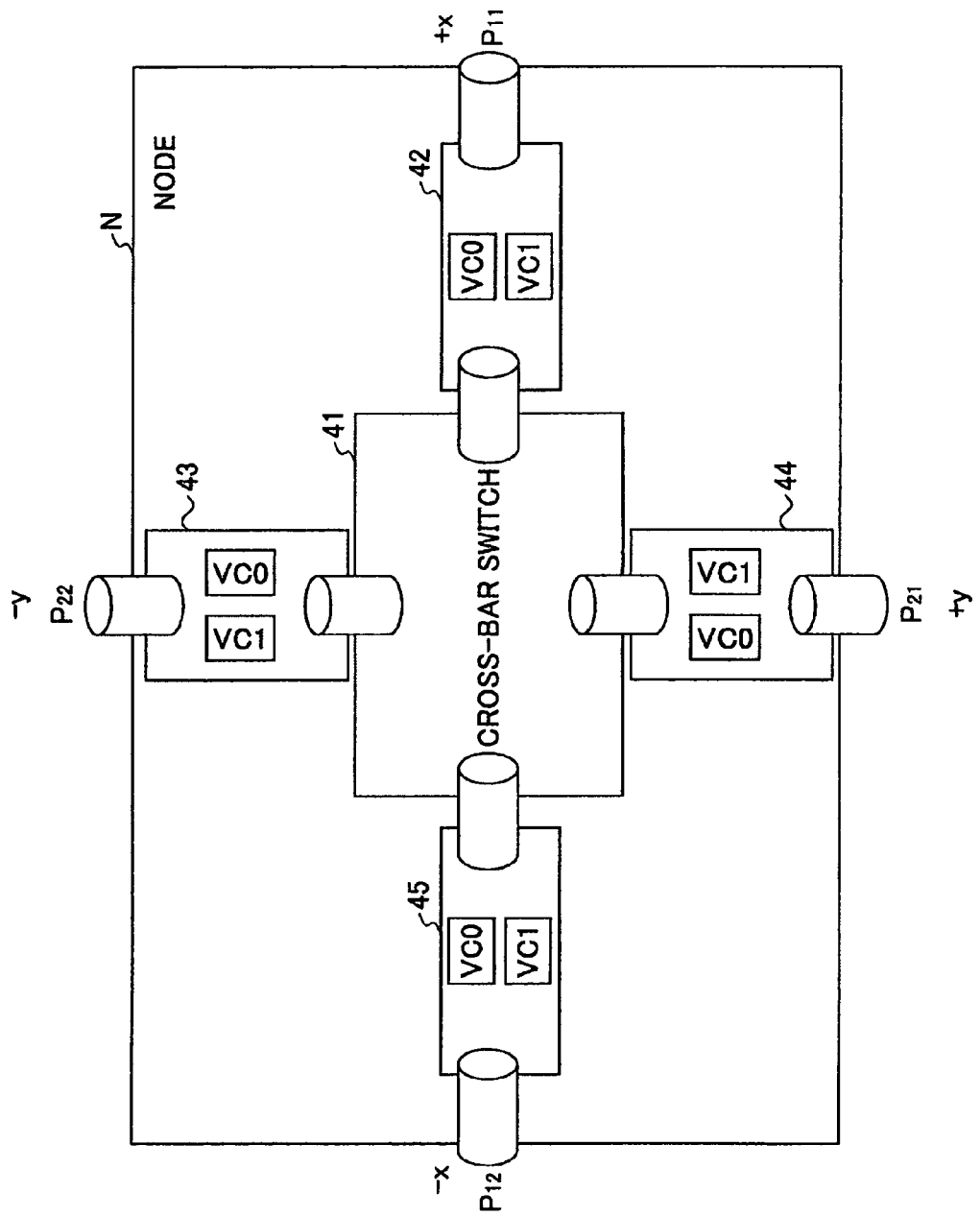
FIG. 5 is a block diagram illustrating a configuration example of the routing controller in FIG. 2.

FIG. 5 is a diagram illustrating a configuration of the nodes N illustrated in FIG. 2. Note that FIG. 5 illustrates the configuration associated with functions of the routing controller 4 for the convenience of illustration. As illustrated in FIG. 5, the routing controller 4 includes a cross-bar switch 41. The cross-bar switch 41 serves as an arbitration unit when the data packets transferred by the node N having the cross-bar switch 41 compete.

Note that the nodes N illustrated in FIGS. 1 and 2 include a set of data transmitting and receiving ports for each direction. The set of data transmitting and receiving ports includes one transmitting port and one receiving port. The node N includes a total of four sets of data transmitting and receiving ports, which are a +x direction transmitting and receiving port set $P_{11}$, a −x direction transmitting and receiving port set $P_{12}$, a +y direction transmitting and receiving port set $P_{21}$, and a −y direction transmitting and receiving port set $P_{22}$. Further, the set of data transmitting and receiving ports includes the buffers configured to temporarily store the data packets to be transferred, the number of which corresponds to the number of virtual channels. Specifically, the information processing system according to the first embodiment includes two virtual channels indicated by VC0 and VC1. Since the node N includes the total of four sets of data transmitting and receiving ports, eight buffers are provided in the node N according to the first embodiment as illustrated in FIG. 5. In FIG. 5, two buffers are provided for each set of data transmitting and receiving ports for the virtual channels VC0 and VC1. A case where the transferring data packets compete is where the virtual channels transmit two or more data packets identical in directions where the data packets are transmitted.

Further, the data packets received by the node N are stored in one of the buffers of the virtual channels (VC0, VC1) provided for the virtual channel side in each direction. The buffer includes a first in first out structure so that the buffer sequentially transmits the data packet from the first one to the last one stored in the buffer. Note that among a total of eight first data packets stored in the respective buffers, the data packets having the identical channels and the mutually matching transferring directions are those competing data packets described above.

Figure 6:
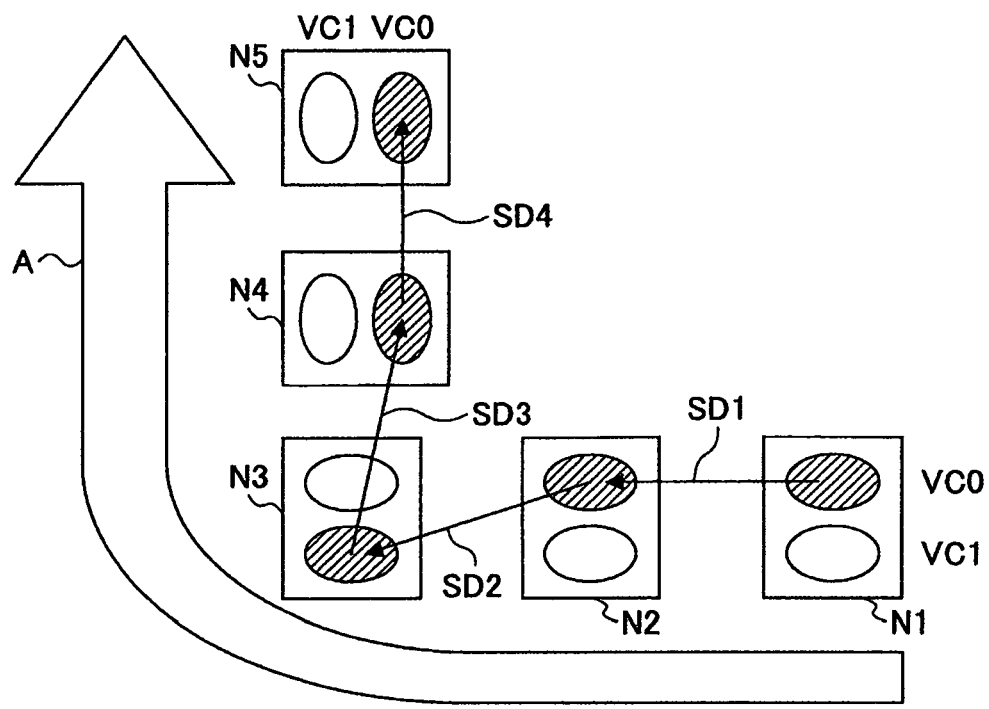
FIG. 6 is a diagram (part 1) illustrating an example of the virtual channel control method in FIG. 4.

FIG. 6 is a diagram illustrating behaviors of the data packet when the virtual channel control method illustrated with reference to FIG. 4 is conducted. In FIG. 6, data are transferred from the node located at a lower right position to the node located at an upper left position as indicated by a data transfer direction A. That is, in FIG. 6, the data are transferred from the nodes N1 to N5. Note that in the example of FIG. 6, the node N5 is not the final destination node.

In FIG. 6, two oval shapes in each node indicate respective buffers in the virtual channels VC0 and VC1. Further, the hatched one of the oval shapes indicates the buffer that has stored the data packet.

In FIG. 6, the data are initially transferred from the node N1 to the node N3 in a left direction, and the dimension in which the data are transferred is changed to a destination dimension, i.e., a new dimension after the data has reached the node N3. Thereafter, in FIG. 6, the data are transferred from the nodes N3 to N5 in an upper direction. In a case of FIG. 6, the data will not cross the dateline while the data are being transferred. Thus, the determination result in step S11 illustrated in FIG. 4 is continuously "NO" while the data illustrated in FIG. 6 is transferred.

In FIG. 6, when the data are transferred from the node N1 to the node N2, and coordinates of the node N2 in a dimension in which the data are received correspond to coordinates one node before the destination node N3, the coordinates of which reside in the same dimension. Accordingly, the determination result in step S13 is "YES". In FIG. 6, the data received by the node N2 is illustrated as SD1, which are stored in the buffer for the virtual channel VC0 of the nodes N1 and N2. Thus, in the node N2, the virtual channel is changed based on the determination result in step S13 such that the virtual channel VC0 utilized for transferring the data is made to transition to that of the virtual channel VC1 (step S14). As a result, after the data (SD2) are transferred from the node N2, the transferred data SD2 are stored in the buffer for the virtual channel VC1.

Note that the coordinates of the node N3 having dimensions receiving the data from node N2 match the coordinates of the destination node having the same dimensions as those of the node N3. Accordingly, the determination result of the node N3 in step S15 in FIG. 4 is "YES". Further, the node N3 is not a final destination node ("NO" in step S16). As a result, when the data (SD3) are transferred from the node N3 to the node N4, the current virtual channel VC 1 transferring the data transitions back to the virtual channel VC0 (step S17). That is, the data (SD1) that has transitioned from the virtual channel VC0 to the virtual channel VC1 transitions back to the original virtual channel VC0 (see SD3). Subsequently, the data are transferred from the node N4 to the node N5. The data transferred from the node N4 to the node N5 are indicated by SD4 in FIG. 6.

Next, a virtual channel control method differing from the example illustrated in FIG. 6 is described with reference to FIG. 7.

Figure 7:
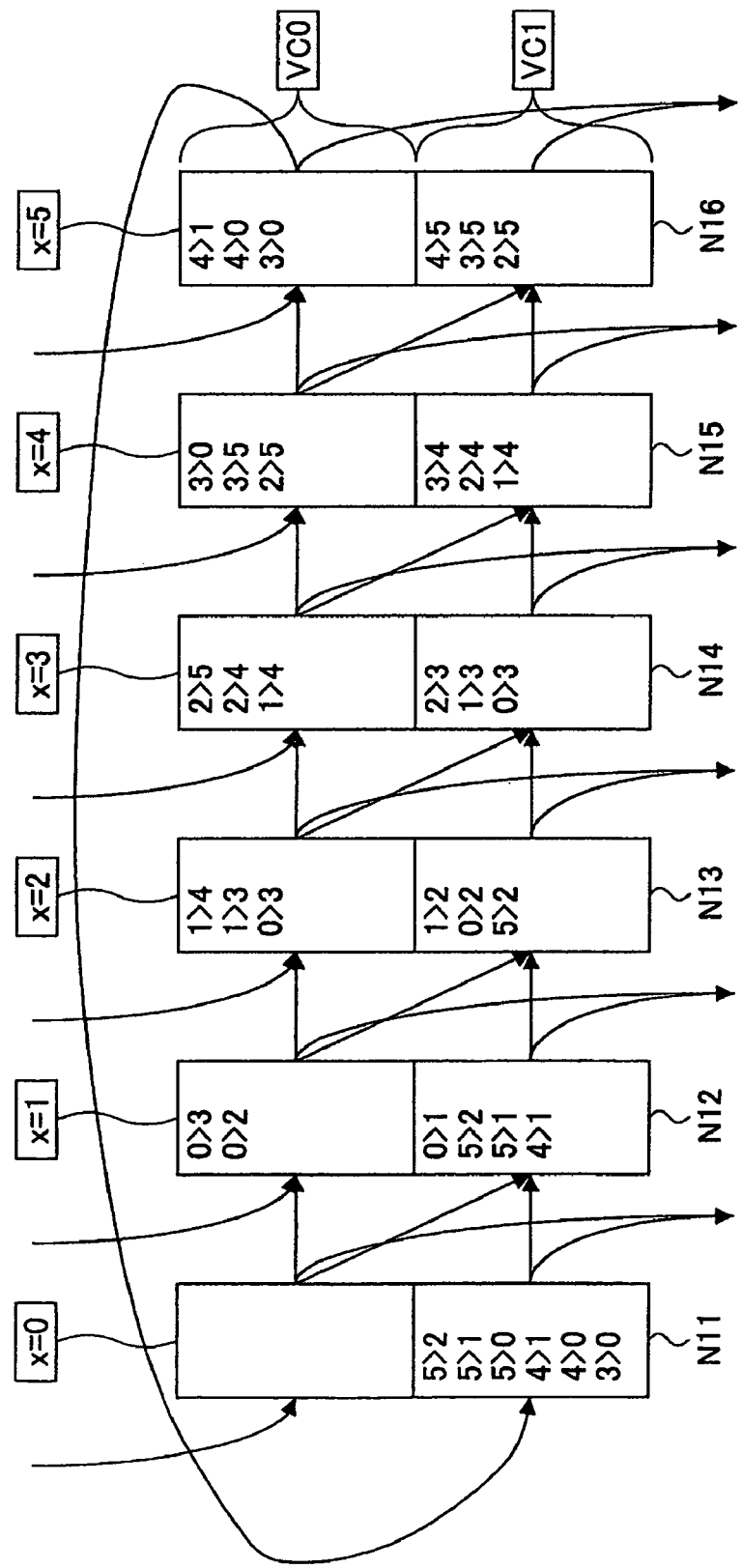
FIG. 7 is a diagram (part 2) illustrating another example of the virtual channel control method in FIG. 4.

FIG. 7 illustrates six nodes N11 to N16 arrayed along the x axis that are selected from the arrays of the nodes illustrated in FIG. 1. The respective x coordinates of the nodes N11 to N16 are 0 through 5. In FIG. 7, it is assumed that the data packet is transferred from −x side to +x side for convenience of explanation. Further, in FIG. 7, an upper part of each node indicates a buffer in the virtual channel VC0 and a lower part of the node indicates a buffer for the virtual channel VC1. In addition, "0<3", "0>2", "1>4", "1>3", and the like illustrated in the nodea represent data packets stored in the nodea. For example, in "0>3", "0" noted on a left hand side of ">" indicates the x coordinate of the source node, and "3" noted on a right hand side of ">" indicates the x coordinate of the destination node.

Further, in the example of FIG. 7, the dateline is provided between the x coordinates of 0 and 5; that is, the dateline is provided between the node N11 and the node N16. For example, in the data "4>1" stored in the uppermost part of the buffer in the VC0 of the node N16, the source node of the data has the x coordinate of 4 and the destination node of the data has the x coordinate of 1. That is, the data are to be transferred from the node N15 to the node N12. Note that the information processing system according to the first embodiment has the torus connection configuration, that is, a circular connection configuration, a transferring direction of which is one-way direction. That is, in the example of FIG. 7, the data transferring direction in the x axis dimension is determined as the +x direction. Thus, the data packet "4>1" is transferred in the +x direction from the node N15 arranged adjacent to the node N16 and having the x coordinate of 4, and is then received by the node N16. The data packet is subsequently transferred from the node N16 to the node N11 having the x coordinate of 0. Thereafter, the data packet is transferred from the node N11 to the node N12 having the x coordinate of 1. Specifically, in this case, due to the cyclic connection configuration of the nodes, after the data packet has reached the node N16 having the largest x coordinate value "5", the data packet is directly transmitted from the node N16 to the node N11 having the smallest x coordinate value "0". Subsequently, the data packet is transferred to the destination node N12 having the x coordinate "1". Note that when the data packet is transferred from the node N16 to the node N11, the data packet crosses an interval between the x coordinates 5 and 0; that is, the data packet crosses the dateline. In this case, the determination result in step S11 of FIG. 4 is "YES", and the current virtual channel allocated to the data packet is made to transition to the virtual channel VC1.

Next, in FIG. 7, the focus is on the data packet "0>1" stored in the uppermost part of the lower buffer for the virtual channel VC1 of the node N12. The source node of the data packet "0>1" has the x coordinate "0", the coordinate position of which corresponds to that of the node N11 residing on an immediate left hand side of the node N12 that holds the data packet "0>1". Further, the destination node of the data packet "0>1" has the x coordinate "1", the coordinate position of which corresponds to that of the own node N12. Accordingly, the data packet is transferred in the +x direction from the node N11 to the node N12; that is, the data packet is transferred to the right hand side of FIG. 7. Before the transmission of the data packet from the node N11 to the node N12, the virtual channel allocated to the data packet is VC0 in the node N11, and accordingly, the coordinate position "0" in the x axis dimension of the own node N11 is determined as a position one node before the destination node having the coordinate position "1" in the same x axis dimension, to which the data packet is addressed ("YES" in step S13 in FIG. 4). As a result, in the node N11, the virtual channel VC0 allocated to the data packet is transitioned to the virtual channel VC1 (step S14 in FIG. 14). The data packet is then received by the node N12 via the virtual channel VC1. In a similar manner, the data packets transmitted via the virtual channel VC1 transitioned from the virtual channel VC0 which are received by immediate left side nodes of the corresponding nodes are as follows. That is, in FIG. 7, such data packets include "1>2" and "0>2" in the lower part of the node N13, "2>3", "1>3" and "0>3" in the lower part of the node N14, and "3>4", "2>4" and "1>4" in the lower part of the node N15. Further, the data packets include "4>5", "3>5" and "2>5" in the lower part of the node N16.

As described above, in the information processing system according to the first embodiment, a rule is applied in which the virtual channel VC0 allocated to the data that cross the dateline is transitioned to the virtual channel VC1. That is, a rule illustrated in steps S13 and S14 in addition to the rule illustrated in the steps S11 and S12 of FIG. 4 is applied to the information processing system according to the first embodiment. That is, the rule is added for transitioning a current virtual channel to another one in a node before the node where the dimension of data transmission is transitioned from the x axis to the y axis.

Effects provided by the information processing system according to the first embodiment are described below.

Figure 8:
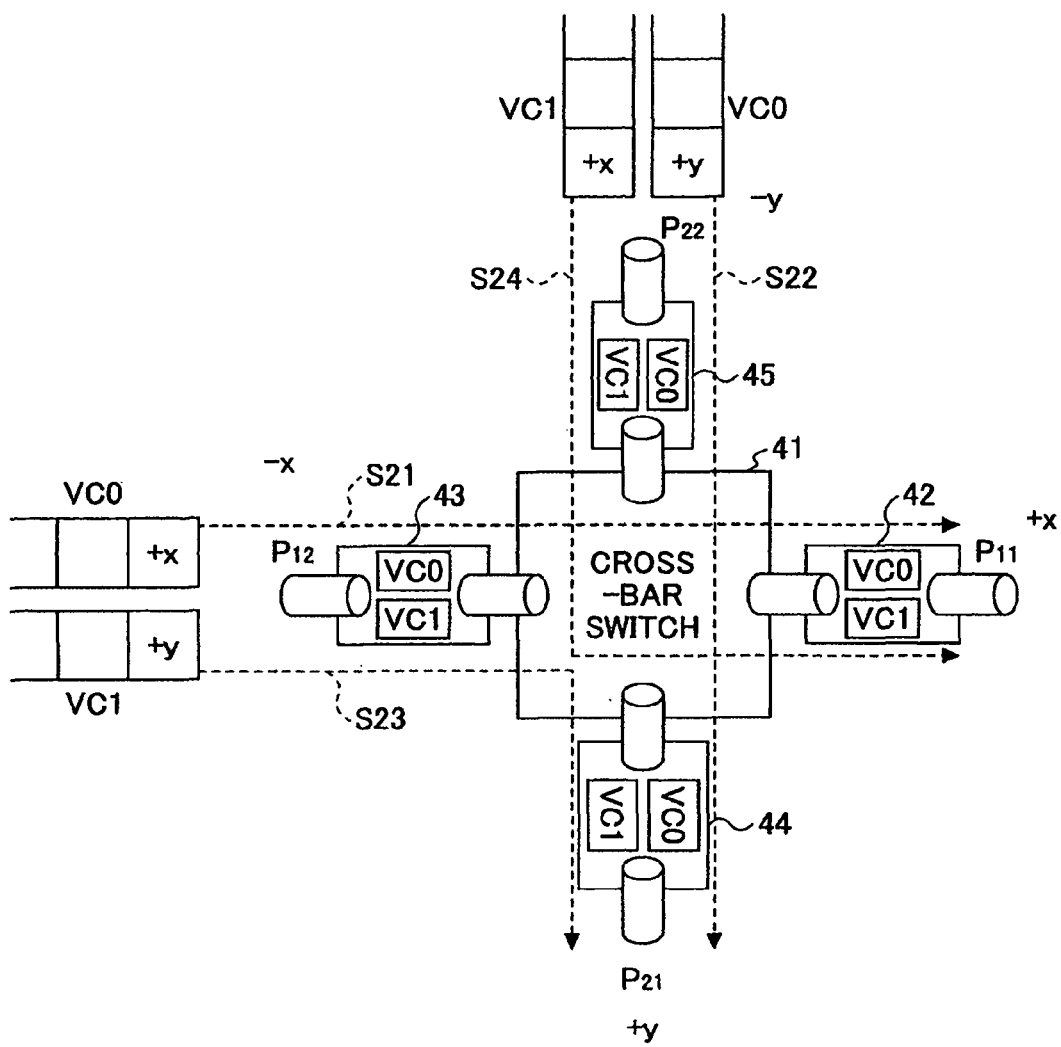
FIG. 8 is a diagram (part 1) illustrating advantages provided by the implementation of the virtual channel control method.

The effects provided by the information processing system according to the first embodiment may include an increased opportunity in handshaking with the cross-bar switch 41 and its probability. This aspect is described with reference to FIG. 8. The following operations may be performed when one node transfers the data to another node. First, cross-bar interfaces 42 through 45 having data transmitting and receiving ports in respective directions send a data transmission request to the cross-bar switch 41. When the cross-bar switch 41 that has received the transmission requests gets ready to transmit data, the cross-bar switch 41 provides transmission authorization the cross-bar interfaces 42 through 45 to transmit data. Normally, buffers have a FIFO structure so that the transmission requests for the first data packets stored in the respective buffers are transmitted first. In FIG. 8, the respective virtual channels of the buffers are represented by the VC0 and VC1.

In a case of the information processing system according to the first embodiment, since the rule of steps S13 and S14 is provided in addition to the rules of the steps in FIG. 4, the frequency of the data packet transition between the virtual channels VC0 and VC1 is significantly increased. Accordingly, the data packets may be easily dispersed in the two buffers for the virtual channels VC0 and VC1 in the data transmitting and receiving port in the corresponding direction. As a result, the data packets are stored in the two buffers for the virtual channels VC0 and VC1 without being disproportionately dispersed in one of the buffers for the virtual channels VC0 and VC1 as illustrated in FIG. 7. Consequently, since the transmission request is sent to the cross-bar switch 41 for the first data packet in each buffer, plural transmission requests may simultaneously be sent to the cross-bar switch 41. Thus, the probability of establishing handshakes between the cross-bar interfaces 42 through 45 and the cross-bar switch 41 may be increased. Note that "establishing the handshake" indicates that the cross-bar switch 41 provides transmission authorization to the cross-bar interfaces 42 through 45 when one or more of the cross-bar interfaces 42 through 45 send the transmission requests to the cross-bar switch 41.

In the example of FIG. 8, it is assumed that the virtual channels VC0 and VC1 for the data packets stored in the respective buffers of the cross-bar interfaces 42 through 45 remain unchanged. That is, the virtual channel allocated to the data packet stored in the buffer for the virtual channel VC0 is still the virtual channel VC0, and the virtual channel allocated to the data packet stored in the buffer for the virtual channel VC1 is still the virtual channel VC1 likewise.

Further, in the example of FIG. 8, the following cases may be assumed. That is, the data packet to be sent in +x direction is stored as the first data packet in the buffer for the virtual channel VC0 of the −x axis of the cross-bar interface 43 and the data packet to be sent in +y direction is stored as the first data packet in the buffer for the −x axis of the virtual channel VC1 of the cross-bar interface 43. Likewise, the data packet to be sent in +y direction is stored as the first data packet in the buffer for the virtual channel VC0 of the −y axis of the cross-bar interface 45 whereas the data packet to be sent in +x direction is stored as the first data packet in the buffer for the −y axis of the virtual channel VC1 of the cross-bar interface 45. In these cases, the cross-bar switch 41 performs the following operations.

The transmission request for transmitting the data packet in +x direction from the buffer for the virtual channel VC0 of the cross-bar interface 43 is sent to the cross-bar switch 41 (step S21). Similarly, the transmission request for transmitting the data packet in +y direction from the buffer for the virtual channel VC0 of the cross-bar interface 45 is sent to the cross-bar switch 41 (step S22). The directions of the transmission requests sent to the cross-bar switch 41 in the steps in S21 and S22 are +x and +y directions that are mutually different from each other. Thus, the data packet transmitted from the cross-bar interface 43 does not compete with the data packet transmitted from the cross-bar interface 45. The cross-bar switch 41 thus provides the transmission authorization to the cross-bar interfaces 43 and 45 corresponding to the transmission requests sent in the steps S21 and S22. As a result, the data packets corresponding to the transmission requests sent from the cross-bar interfaces 43 and 45 in the steps S21 and S22 are sent to the cross-bar switch 41.

Similarly, the transmission request for transmitting the data packet in +y direction from the buffer for the virtual channel VC1 of the cross-bar interface 43 is sent to the cross-bar switch 41 (step S23). Similarly, the transmission request for transmitting the data packet in +x direction from the buffer for the virtual channel VC1 of the cross-bar interface 45 is sent to the cross-bar switch 41 (step S24). The directions of the transmission requests sent to the cross-bar interfaces 43 and 45 in the steps in S23 and S24 are +y and +x directions that are mutually different from each other. Thus, the transmission request sent from the cross-bar interface 43 in the step S23 does not compete with the transmission request sent from the cross-bar interface 45 in the step S24. Accordingly, the cross-bar switch 41 thus provides the transmission authorization to the cross-bar interfaces 43 and 45 corresponding to the transmission requests sent in the steps S23 and S24. As a result, the data packets corresponding to the transmission requests sent from the cross-bar interfaces 43 and 45 in the steps S23 and S24 are sent to the cross-bar switch 41.

As described above, in the information processing system according to the first embodiment, two data packets are simultaneously transmitted with high parallel transmission properties. That is, in the information processing system according to the first embodiment, the first data packets stored in the respective buffers are transmitted first via the data transmitting and receiving ports utilizing the two virtual channels VC0 and VC1. Accordingly, since the probability of simultaneously transmitting numerous data packets corresponding to different transmission requests may be increased, and the probability of not competing the directions of the data packets may be increased, efficiency in the data transmission may be increased.

Note that in the information processing system according to the first embodiment having the configuration illustrated in FIG. 1, the virtual channels VC0 include the data packets for coaxial communications so that the frequency of the data packets for axial transition communications stored in the virtual channels VC1 may relatively be increased. Note that the coaxial communication indicates the data transferred without dimensional changes, and the axial transition communication indicates the data transferred with dimensional changes. As a result, the frequency of simultaneously outputting the data packets from the data transmitting and receiving ports in parallel via the corresponding virtual channels may be increased together with the effect of simultaneous outputting the transmission requests from the cross-bar interfaces in parallel. The reasons for increasing the frequency of simultaneous outputting the data packets from the data transmitting and receiving ports in parallel may be as follows. That is, since numerous transmission requests from the cross-bar interfaces are simultaneously output from the respective buffers for the virtual channels, the frequency of outputting the transmission requests that do not compete with one another may be increased as described above. As a result, the frequency of simultaneously outputting the data packets from the data transmitting and receiving ports in parallel may be increased together with the effect of simultaneous outputting the transmission requests from the cross-bar interfaces in parallel.

Further, in the information processing system according to the first embodiment, the difference in the usage of the buffer between the virtual channels VC0 and VC1 may be small. As a result, the probability in the occurrence of data jamming eventually caused by the shortage of the buffers may be lowered. That is, since the data packets are distributed equally in the respective two buffers for the virtual channels VC0 and VC1 in the information processing system according to the first embodiment, an effect equivalent to that provided by increasing the capacities of the buffers for the virtual channels VC0 may be obtained without substantially increasing capacities of the physical buffers.

Figure 9:
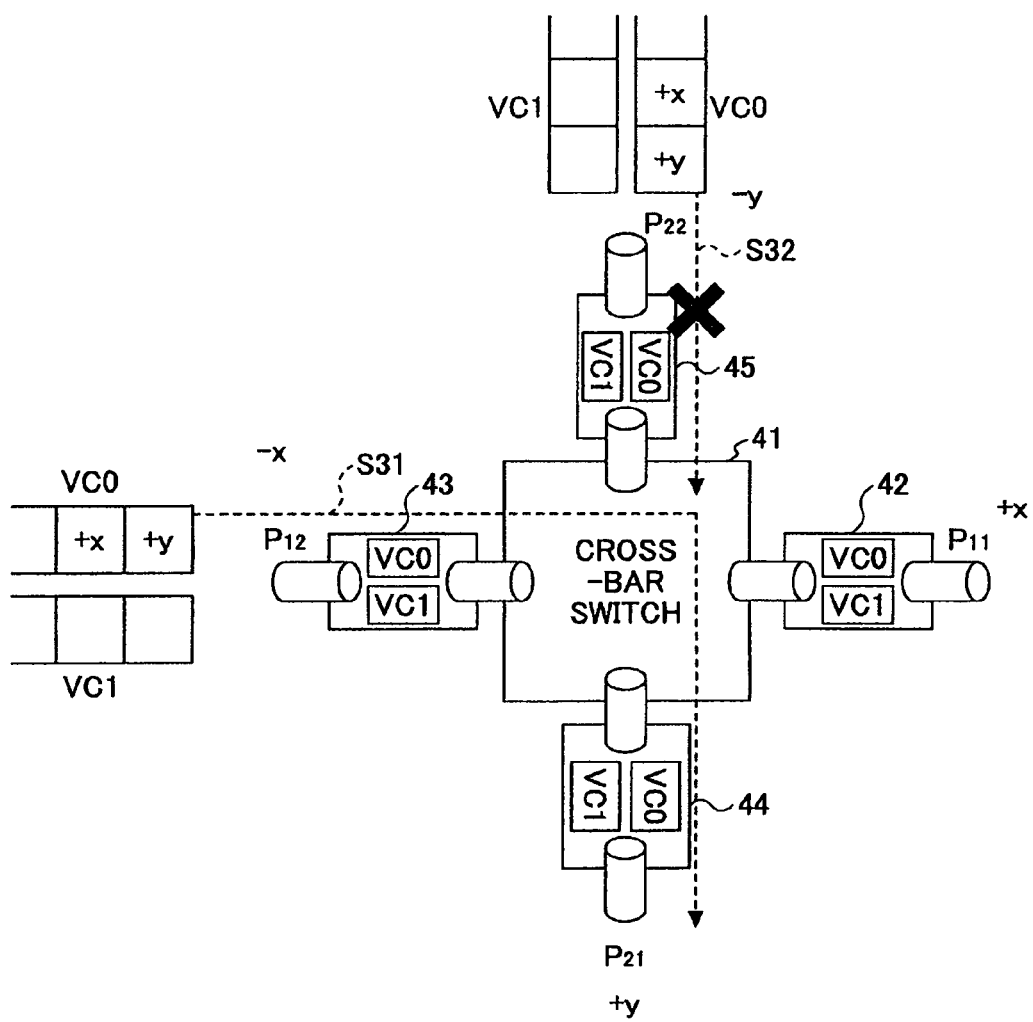
FIG. 9 is a diagram (part 2) illustrating advantages provided by the implementation of the virtual channel control method.

Further, in the information processing system according to the first embodiment, since plural transmission requests are capable of simultaneously being sent to the cross-bar switch 41, the risk of missing the opportunity of transferring a certain data packet may be reduced when the certain data packet is readily transferable. Thus, the variability in time for arbitration carried out by the cross-bar switch 41 may be controlled. A reference example of FIG. 9 illustrates a case where coaxial communication in the +y direction illustrated in step S32 has occurred simultaneously with the occurrence of axial transition communication illustrated in step S31, that is, the axial transition communication where the transferring direction is changed from the +x direction to the +y direction. In this case, the direction of the coaxial communication in step S32 matches the direction of the axial transition communication in step S31. Further, the virtual channel VC0 of the coaxial communication in step S32 matches the virtual channel VC0 of the axial transition communication in step S31. Accordingly, the transmission request for the communication in step S32 competes with the transmission request for the communication in step S31. As a result, the transmission requests for the communications in steps S32 and S31 may not simultaneously be performed, thereby missing one of the communication opportunities. By contrast, in the information processing system according to the first embodiment, the data packets are distributed in the two buffers for the virtual channels VC0 and VC1 as illustrated in FIG. 8. Thus, the coaxial communication in the +y direction illustrated in step S32 has occurred simultaneously with the occurrence of axial transition communication illustrated in step S31, that is, the axial transition communication where the transferring direction is changed from the x direction to the +y direction, so that the respective communications in steps S22 and S23 may be simultaneously carried out even if the +y direction of the communication in step S22 matches the +y direction of the communication in step S23.

Further, in the information processing system according to the first embodiment, since numerous transmission requests are capable of simultaneously being sent to the cross-bar switch 41, the risk of missing the opportunity of transferring the data packets may be effectively reduced. That is, in the case of the information processing system according to the first embodiment illustrated in FIG. 8, the following operations are carried out. The data packet of the coaxial communication in step S22 and the data packet of the axial transition communication from one axis to another axis in step S23 are stored as the first data packets in the buffers corresponding to the virtual channels VC0 and VC 1. When the data packet of the coaxial communication and the data packet of the axial transition communication from one axis to another axis are stored as the first data packets in the respective buffers for the virtual channels VC0 and VC1, the transmission requests for the coaxial communication and axial transition communication are simultaneously sent to the cross-bar switch 41 in parallel. Accordingly, the coaxial communication and the axial transition communication are simultaneously carried out in parallel.

Further, in the reference example of FIG. 9, since the data packets to be transmitted in the +y direction in steps S31 and S32 are stored as the first data packets in the corresponding buffers, the transmission requests for the +y direction are sent to the cross-bar switch 41. On the other hand, the respective buffers for the virtual channels VC0 of the cross-bar interfaces 43 and 45 store the data packets to be transferred in the +y direction first and the data packets to be transferred in the +x direction second. However, since the data packets to be transferred in the +x direction are not stored as the first data packets in the respective buffers, the transmission requests may not be sent to the cross-bar switch 41, and hence the data packets to be transferred in the +x direction may not be transmitted. By contrast, in the information processing system according to the first embodiment, the data packets to be transferred in the +direction are distributed in the two buffers for the virtual channels VC1 as illustrated in FIG. 8. The buffers for the virtual channels VC1 storing the data packets to be transferred in the +x direction differ from the data packets to be transferred in the +y direction stored in the respective buffers for the virtual channels VC0. Thus, the data packets to be transferred in the +x direction are stored as the first data packets in the respective buffers for the virtual channels VC1. Accordingly, the transmission requests for transmitting the data packets in the +x direction may be simultaneously sent to the cross-bar switch 41 in parallel as illustrated in steps S21 and S24.

As illustrated in FIG. 8, in the information processing system according to the first embodiment, there is a high probability in storing the data packets to be transferred in the +x direction and in the +y direction as the first data packets. When the data packets to be transferred in the +x direction and in the +y direction are stored as the first data packets in the respective buffers, the following operations may be performed. That is, the transmission requests for transmitting the data packets in the +x direction (steps S21 and S24) and the transmission requests for transmitting the data packets in the +y direction (steps S23 and S22) are simultaneously sent in parallel. Accordingly, the x axis communication and the y axis communication are simultaneously carried out in parallel as illustrated in FIG. 8. In the information processing system according to the first embodiment, the communication efficiency for the entire parallel computer system may be improved based on the above-described effects.

Figure 10:
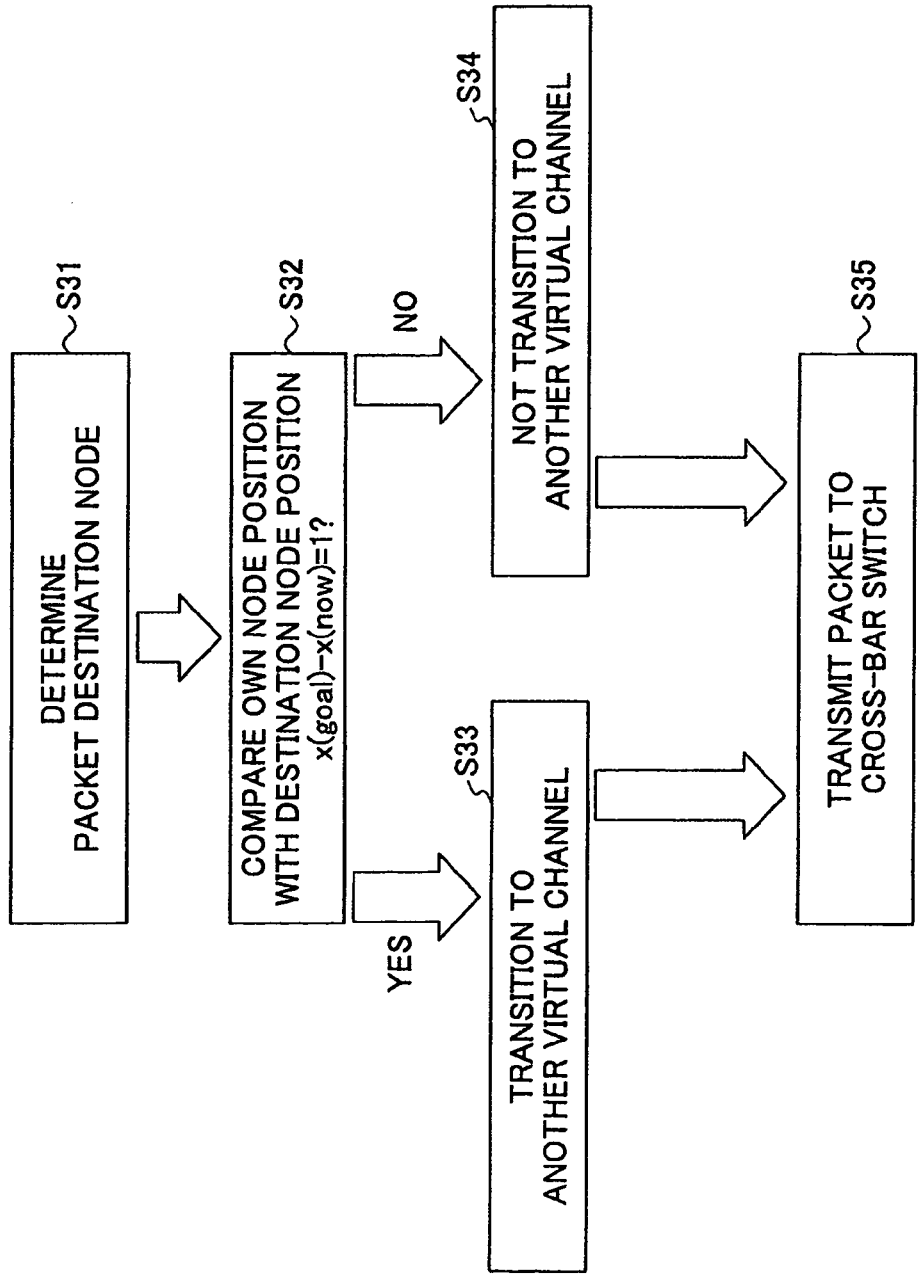
FIG. 10 is a process flowchart specifically illustrating an operational flow of the virtual channel control method.

FIG. 10 is a flowchart specifically illustrating a virtual channel control method according to the first embodiment. In FIG. 10, when the node transmits the data packet, the node determines the destination node of the data packet in step S31. Note that the destination node indicates the destination node in a dimension in which the data packet is transmitted. The destination node in the dimension in which the data packet is transmitted is determined by carrying out the dimension control method described above. For example, if the dimension in which the data packet is to be transmitted is the x axis, the x coordinate of the destination node to which the data packet is transmitted is determined. Subsequently, the position of the determined destination node to which the data packet is to be transmitted and the position of the own node are compared in step S32. If the comparison result indicates that the position of the own node matches a position one node before the destination node ("YES" in step S32), that is, if the position of the own node matches a position one node before the destination node, the process to be carried out is moved to the process in step S33. In step S33, the node changes the current virtual channel for the data packet transmission to another virtual channel. If, on the other hand, the determination result in step S32 is "NO", the node does not change the current virtual channel for the data packet transmission (step S34). Subsequently to step S33 or S34, the node transmits the data packet to the cross-bar switch 41.

Figure 11:
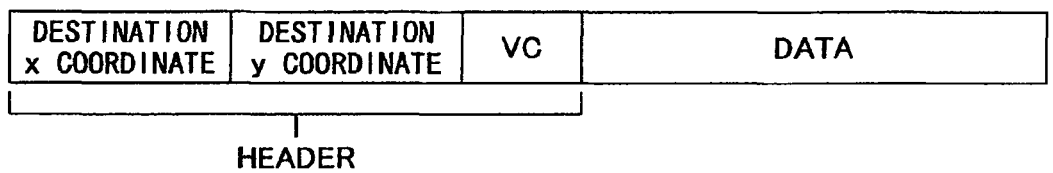
FIG. 11 is a diagram illustrating a configuration example of a data packet applicable to the information processing system according to the first embodiment.

When the virtual channel control method is realized as illustrated in FIG. 10 or the like, information stored in the header of the data packet may be utilized. FIG. 11 illustrates a minimum necessary configuration of the data packet. That is, the x and y coordinates of the destination node to which the data packet is transmitted are stored in the header of the data packet. Note that the information stored in the header of the data packet may include coordinates relative to the coordinates of the destination node instead of the above-described coordinates of the destination node. In this case, the coordinates relative to the coordinates of the destination node are stored in the header of the data packet and the coordinates relative to the coordinates of the destination node may be appropriately overwritten with the new ones every time the data packet moves between the nodes. Further, virtual channel information VC (e.g., 2 bits) is stored in the header of the data packet. The virtual channel information VC is information to identify whether the virtual channel of the data packet is VC0 or VC1. On receiving the data packet, the node refers to the virtual channel information VC and the stores the data packet in the corresponding buffer for the virtual channel indicated by the virtual channel information VC.

Figure 12:
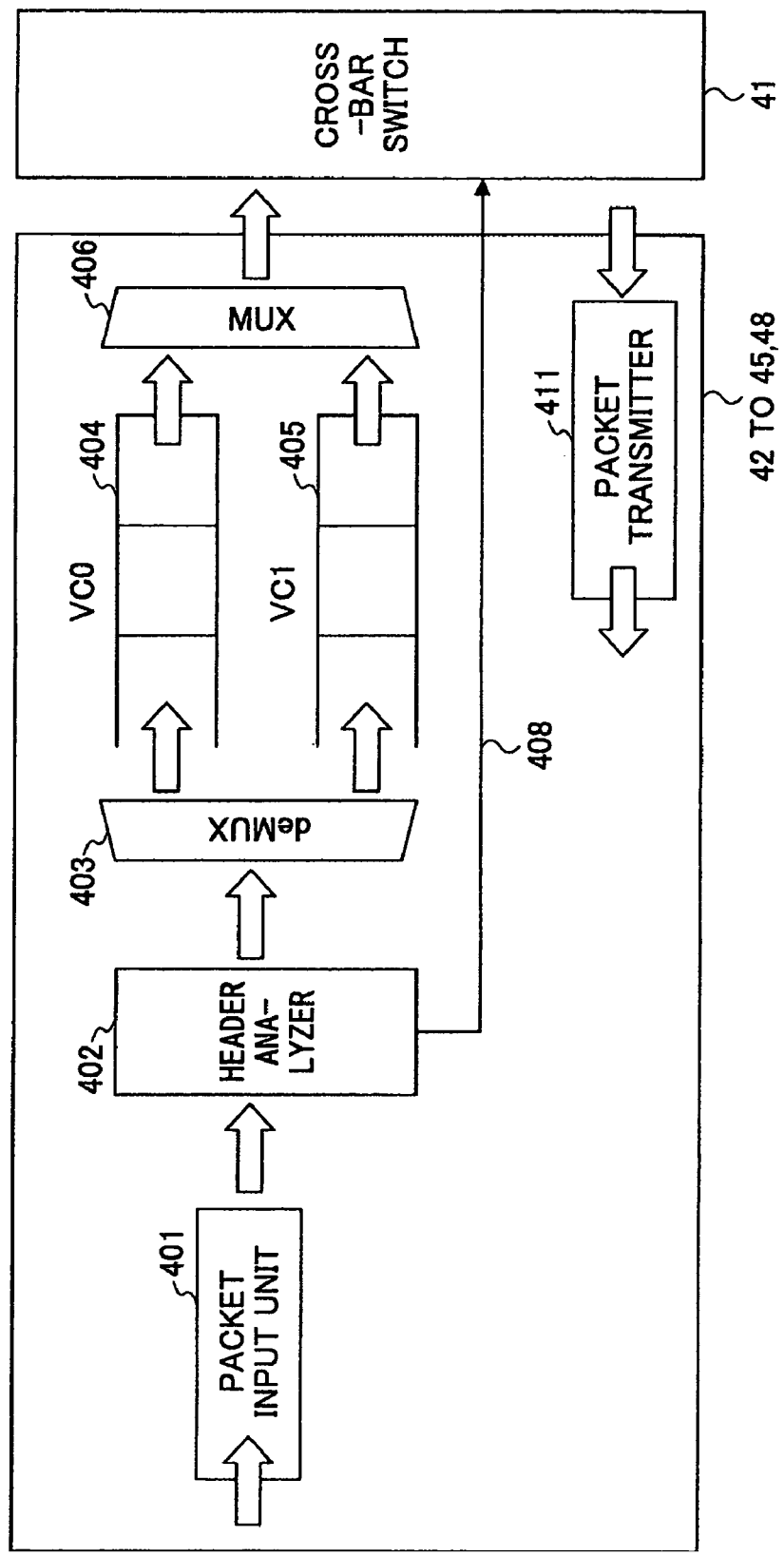
FIG. 12 is a diagram (part 1) illustrating a configuration example of a cross-bar interface contained in the routing controller in FIG. 2.

FIG. 12 is a block diagram illustrating a configuration example of the routing controller 4 illustrated in FIG. 2. FIG. 12 illustrates the configuration example of the routing controller 4 that includes cross-bar interfaces 42 through 45 provided in the four directions illustrated in FIG. 2, namely, +x, −x, +y, and −y directions of the data transmitting and receiving ports, and a CPU cross-bar interface 48 that will be described with reference to FIG. 14.

Each of the cross-bar interfaces 42 through 45 and the CPU cross-bar interface 48 illustrated in FIG. 12 includes a packet input unit 401, a header analyzer 402, a demultiplexer 403, a buffer 404 of the virtual channel VC0, a buffer 405 of the virtual channel VC1, a multiplexer 406, and a packet transmitter 411.

The packet input unit 401 is connected to the header analyzer 402 to transmit the data packet to the header analyzer 402, which has been received by the node including the routing controller 4 via a corresponding one of the data transmitting and receiving ports. In the header analyzer 402, the x and y coordinates of the destination node stored in the header of the received packet and the virtual channel information VC are determined, and the dimension control method illustrated in FIG. 3 and the virtual channel control method illustrated ion FIG. 4 are then carried out based on the determined result.

As a result of carrying out the virtual channel control method, the header analyzer 402 determines whether the current virtual channel of the data packet is to be changed to another one. If the header analyzer 402 determines that the current virtual channel of the data packet is to be changed to another one as the determined result, the virtual channel information VC of the data packet is overwritten with new virtual channel information VC. If the header analyzer 402 determines that the current virtual channel of the data packet is not to be changed to another one as the determined result, the virtual channel information VC of the data packet is not overwritten with new virtual channel information VC. Subsequently, the header analyzer 402 transmits the data packet to the demultiplexer 403. Further, when the header analyzer 402 transmits the data packet from the multiplexer 406 to the cross-bar switch 41, the header analyzer 402 transmits the transmission request 408 corresponding to the data packet in advance.

Under the control of the header analyzer 402, the demultiplexer 403 transmits the data packet to one of the buffers 404 and 405 corresponding to the virtual channels VC0 and VC1 indicated by the virtual channel information VC contained in the data packet transmitted from the header analyzer 402 at a time of being received by the node. That is, as illustrated above, even if the header analyzer 402 overwrites the virtual channel information VC with new information as the result of carrying out the virtual channel control method, the demultiplexer 403 stores the data packet in the buffer indicated by the virtual channel information VC before the virtual channel information VC is overwritten with new information.

Under the control of the header analyzer 402, the data packet stored in the buffer 404 or 405 is sequentially transmitted to the cross-bar switch 41 from the corresponding one of the cross-bar interfaces via the multiplexer 406. When the data packet is transmitted from the corresponding one of the cross-bar interfaces to the cross-bar switch 41, the transmission request for the corresponding data packet is transmitted in advance from the header analyzer 402 of the corresponding cross-bar interface to the cross-bar switch 41 as described above. The header analyzer 402 takes out the data packet from the corresponding one of the buffers 404 and 405 and transmits the data packet to the cross-bar switch 41 via the multiplexer 406 only when the transmission authorization is provided from the cross-bar switch 41.

When the transmission requests transmitted from the cross-bar interfaces 42 through 45 are in completion with one another, the cross-bar switch 41 performs arbitration between the transmission requests. Note that when the transmission requests are in completion with one another, the directions of the data packets corresponding to the plural transmission requests are matched with one another, and the virtual channels indicated by the respective virtual channel information VC are matched with one another. The order of arbitrating the four data transmitting and receiving ports is not specifically limited; however, priorities in arbitrating the four data transmitting and receiving ports may be determined in advance, and the arbitration may be carried out based on the determined priorities or based on the arbitration history.

When the transmission request of one data packet does not compete with the transmission request of another data packet, the cross-bar switch 41 provides the transmission authorization to the respective data packets. The cross-bar switch 41 transmits the data packet transferred from the source cross-bar interface to the cross-bar interface in the transmission direction based on the corresponding transmission authorization. On the other hand, when the transmission request of one data packet competes with the transmission request of another data packet, the cross-bar switch 41 performs the above-described arbitration. As a result of the arbitration, the cross-bar switch 41 provides the transmission authorization to one of the data packets. The cross-bar switch 41 then transmits the data packet transferred from the source cross-bar interface to the cross-bar interface in the transmission direction based on the corresponding transmission authorization. The data packet is transmitted outside of the node from the packet transmitter 411 of the cross-bar interface in the corresponding direction via the corresponding one of the data transmitting and receiving ports.

In the example of FIG. 12, respective blocks 401, 402, 403, 404, 405, 406, and 411 of the cross-bar interfaces 42 through 45, 48 may be realized with hardware. With the realization of the respective blocks with hardware, the data packet processing may be performed at higher rates compared with the realization of the respective blocks with software.

Figure 13:
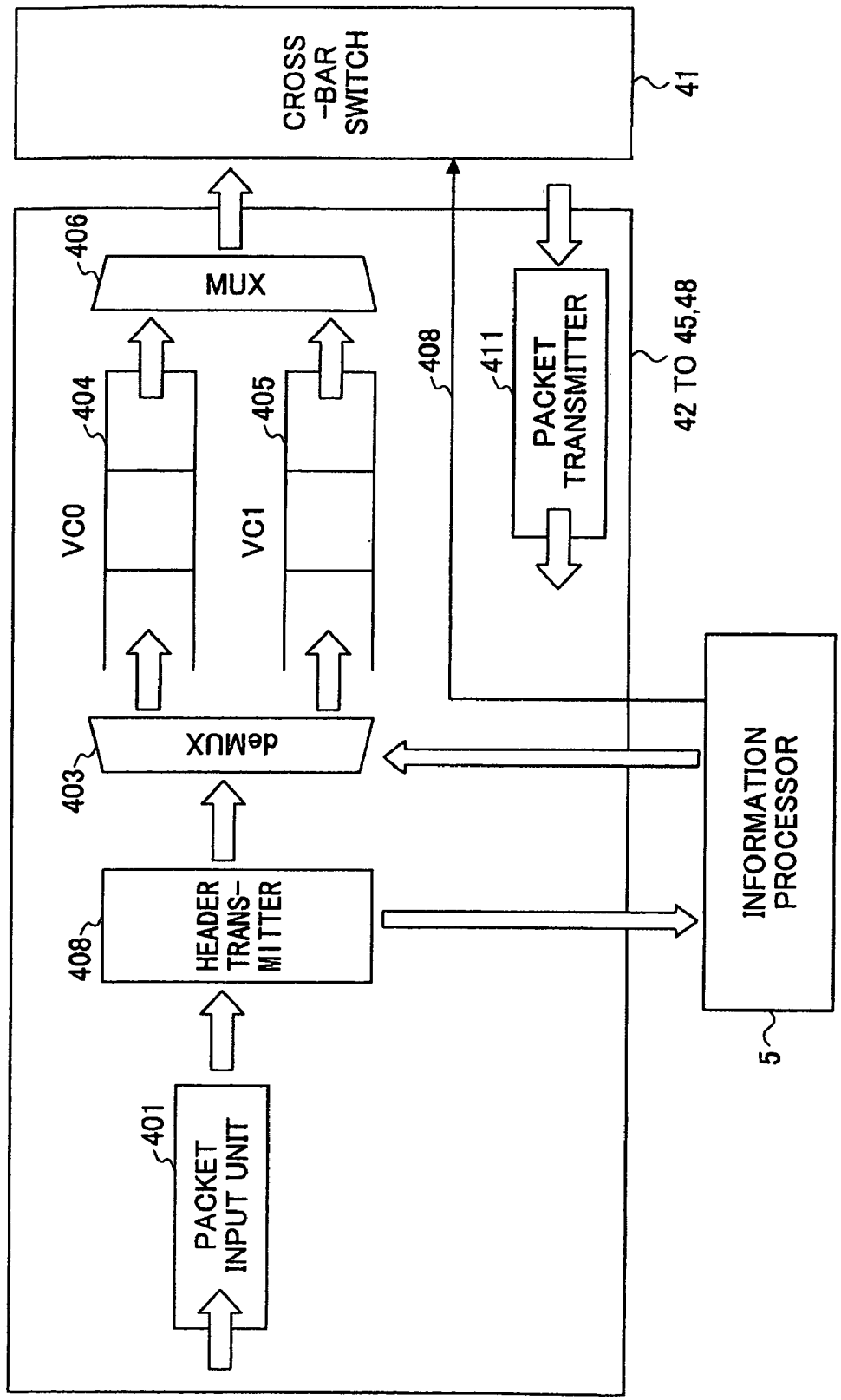
FIG. 13 is a diagram (part 2) illustrating a configuration example of the cross-bar interface contained in the routing controller in FIG. 2.

FIG. 13 illustrates a configuration example of the cross-bar interface illustrated in FIG. 12 to which a header transmitter 408 is provided in place of the header analyzer 402. In the example illustrated in FIG. 13, the operations previously performed by the header analyzer 402 are performed by allowing the information processor 5, which is provided outside of the cross-bar interface, to execute software. Other parts of the example are the same as those described in FIG. 12 and their descriptions are thus omitted. In the configuration example of FIG. 13, when the dimension control method illustrated with reference to FIG. 3 or the virtual channel control method illustrated with reference to FIG. 4 is changed, it may be relatively easy to change specific contents of the dimension control method or the virtual channel control method. That is, in the configuration example of FIG. 13, it may be easy to change the specific contents of the dimension control method or the virtual channel control method by changing the software to be installed in the information processor 5. As a result, it may be easy to change the routing method.

Figure 14:
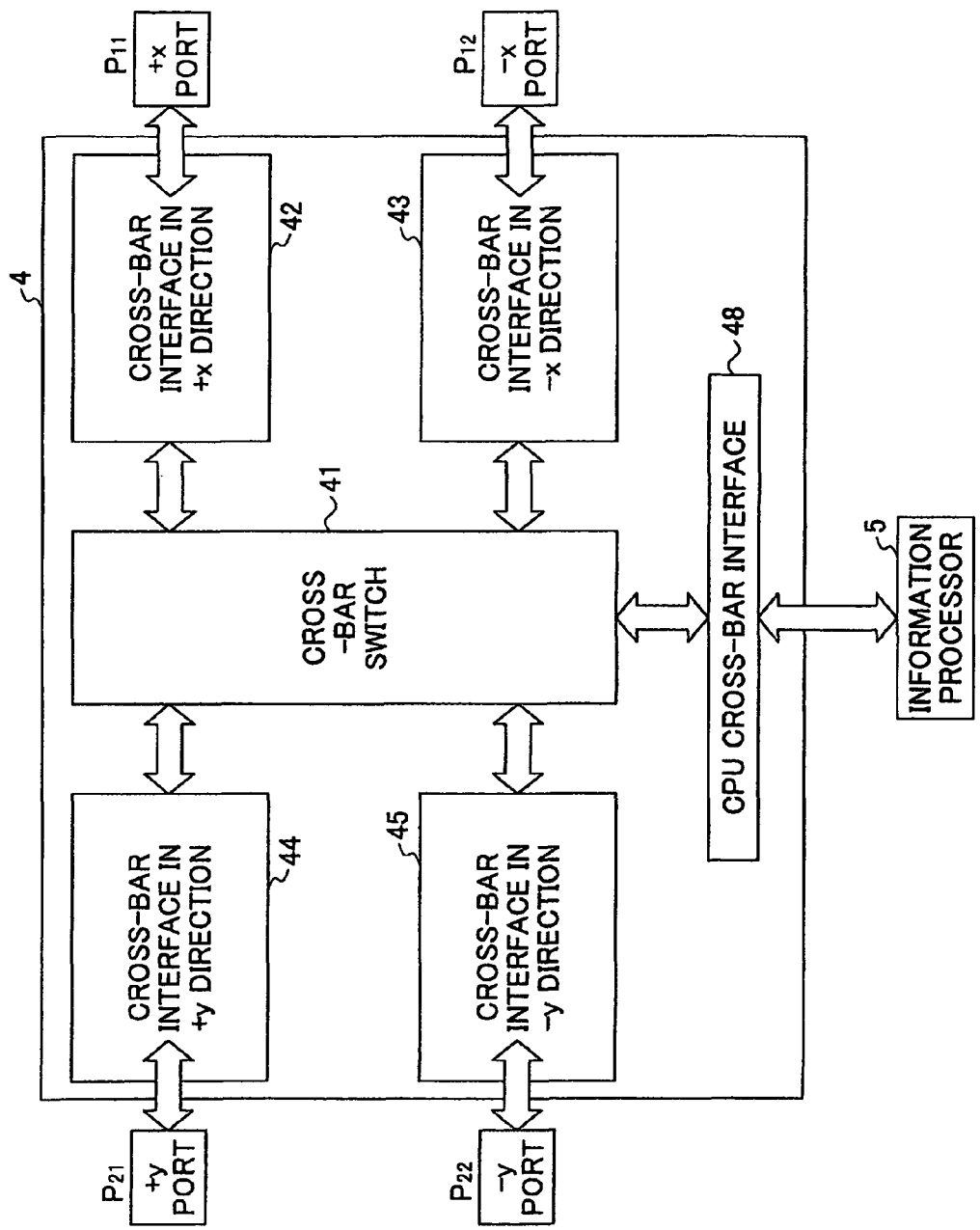
FIG. 14 is a diagram illustrating a configuration example of the routing controller in FIG. 2.

FIG. 14 is a block diagram illustrating a configuration example of the routing controller 4 in which the cross-bar interfaces 42 through 45 are arranged in +x, −x, +y, and −y directions corresponding to the +x, −x, +y, and −y data transmitting and receiving ports $P_{11}$, $P_{12}$, $P_{21}$, and $P_{22}$. As illustrated in FIG. 14, the routing controller further includes the CPU cross-bar interface 48 in addition to the cross-bar interfaces 42 through 45 arranged in the +x, −x, +y, and −y directions. In the node, the CPU cross-bar interface 48 is connected to the information processor 5. In the information processing system according to the first embodiment, the CPU cross-bar interface 48 includes a configuration similar to those of the cross-bar interfaces 42 through 45 arranged in the +x, −x, +y, and −y directions illustrated in FIGS. 12 and 13. In FIG. 12, on receiving the data packet from the information processor 5, the CPU cross-bar interface 48 transfers the received data packet to the packet analyzer 402 via the packet input unit 401. The packet analyzer 402 executes the dimension control method illustrated in FIG. 3 and the virtual channel control method illustrated in FIG. 4. An initial value for the "dimension in which the data packet is transferred" in the dimension control method may, for example, be determined as a first dimension, that is, the x axis. Similarly, an initial value for the "virtual channel allocated to the data packet" in the virtual channel control method may, for example, be determined as a first virtual channel, that is, the virtual channel VC0. Further, the cross-bar switch 41 receives the transmission request from the CPU cross-bar interface 48 in addition to the transmission requests from the cross-bar interfaces 42 through 45 arranged in the +x, −x, +y, and −y directions and may optionally perform the arbitration between the transmission requests received from the transmission requests from the cross-bar interfaces 42 through 45 arranged in the +x, −x, +y, and −y directions including the transmission request received from the CPU cross-bar interface 48.

Figure 15:
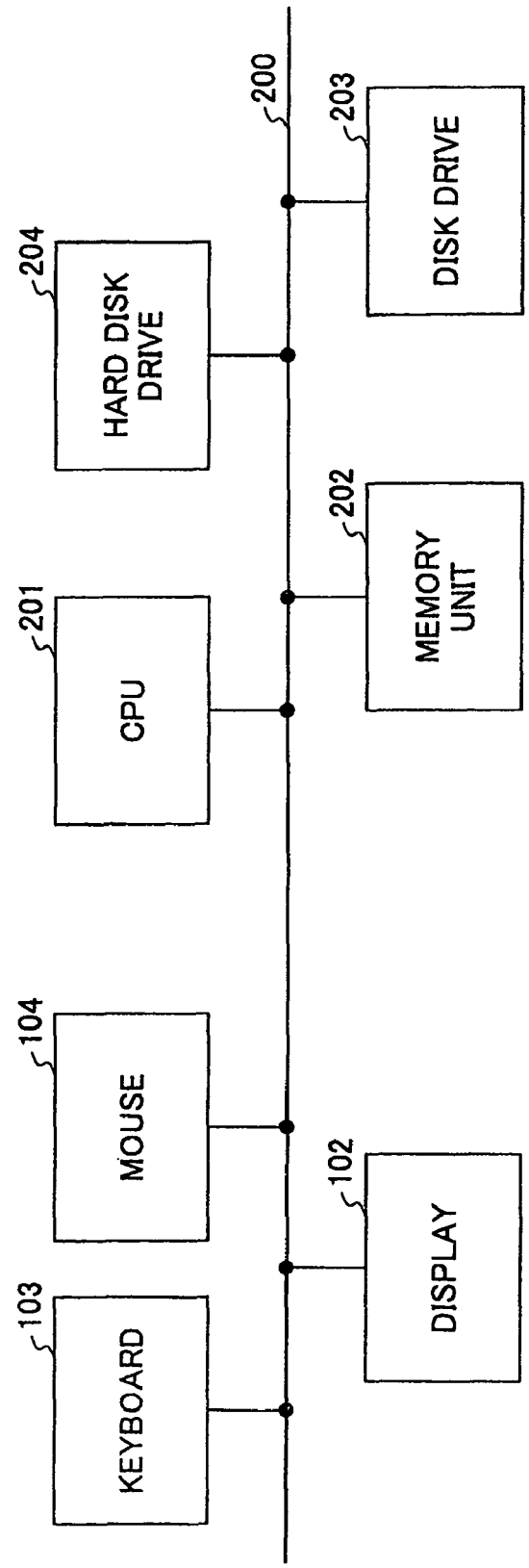
FIG. 15 is a block diagram illustrating a configuration example of an information processor in FIG. 2.

FIG. 15 illustrates a configuration example of the information processor 5. In FIG. 15, a main body unit 101 includes a CPU 201, a memory unit 202 formed of a RAM or a ROM connected via a general-purpose bus 200, a disk drive 203 for a disk 110 and a hard disk drive (HDD) 204. As illustrated in FIG. 15, a display 102, a keyboard 103 and a mouse 104 are also connected to the CPU 201 via the bus 200; however, the keyboard 103 and the mouse 104 may directly be connected to the CPU 201. Note that the configuration of the information processor 5 is not limited to the configuration illustrated in FIG. 15; however, the information processor 5 may alternatively include one of various configurations known in the art.

In the information processor 5 having the above configuration, when the information processor 5 employs the configuration of FIG. 13, programs for causing a computer to execute the above-described dimension control method and the virtual channel control method are installed and executed by the CPU 201. Consequently, the dimension control method and the virtual channel control method may be realized by the execution of the software as also illustrated above with reference to FIG. 13.

The results obtained by validating functional effect with simulation are described below. An initial condition and contents of settings for the simulation are as follows.

a two-dimensional torus connection configuration with 8*8 node arrangement is employed as the topology two CPU cross-bar interfaces 48 are provided data packet pattern: all the nodes can include 64 data packets and the nodes are configured to transfer the data packets to other nodes; the 64 data packets include a combined pattern of a "same destination+length"

the "length of a packet" and the "destination of data packet" are set by utilizing uniform random numbers; the "length of the data packet" is set in a range of 1 to 128 clock cycles All the data packets in the initial state are stored in the CPU cross-bar interface 48 no cable delay is expected

Further, an algorithm of the simulation is as follows.

1) the cross-bar switch 41 checks a current transmission status.

2) the cross-bar switch 41 checks the transmission requests received from the cross-bar interfaces arranged in the respective directions and the CPU cross-bar interface 48 and performs homogeneous uniform arbitration based on the transmission status.

3) as a result of the arbitration performed by the cross-bar switch 41, the cross-bar interfaces that have received the "transmission authorization" or the CPU cross-bar interface 48 initiates transferring of the data packet 4) the above processes are conducted in respective time steps until the data packets reach a desired one of the CPU cross-bar interfaces 48

Figure 16:
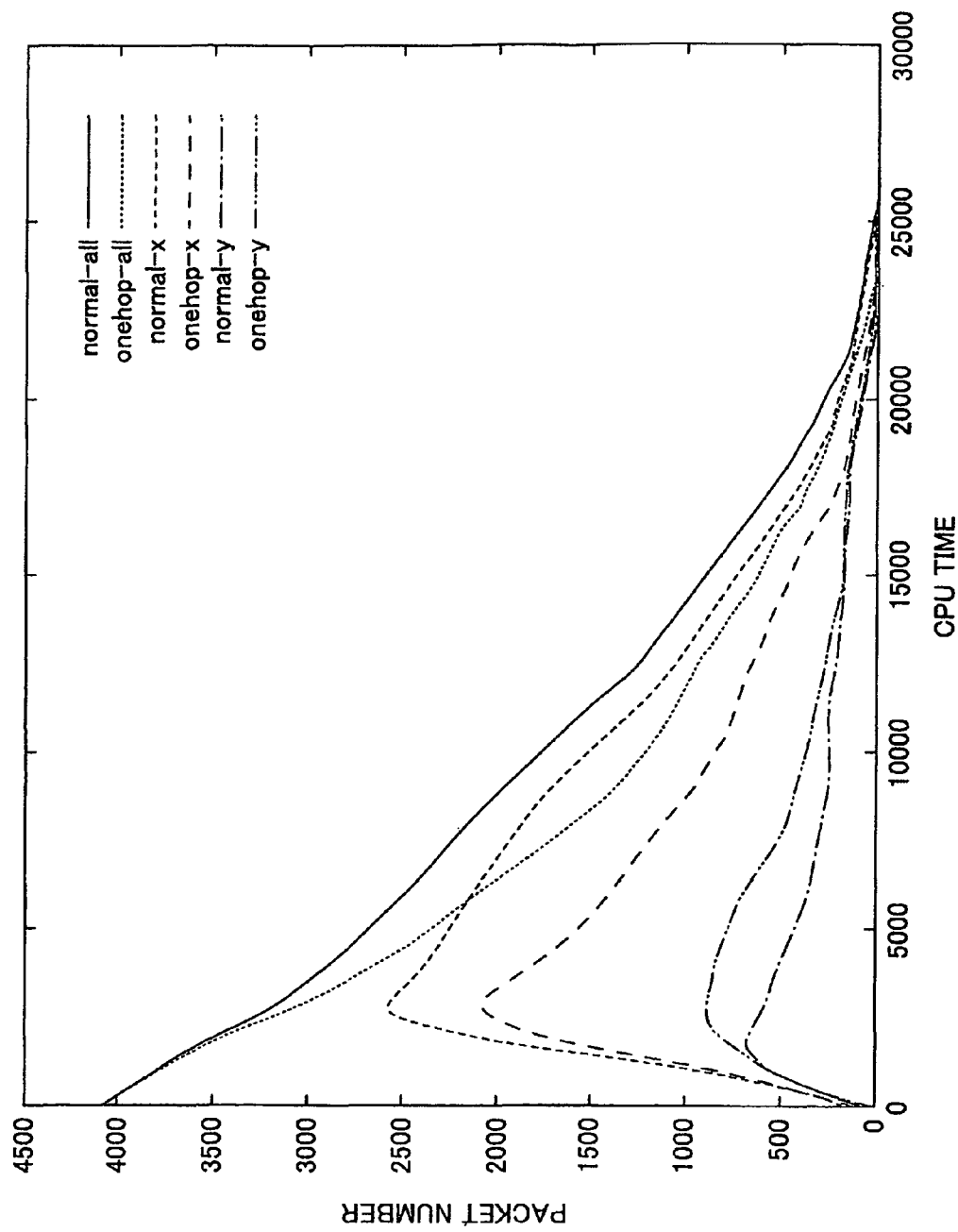
FIG. 16 is a simulation result for validating advantages provided by the application of the information processing system according to the first embodiment.

The results of the simulation are illustrated in FIG. 16. In FIG. 16, a vertical axis represents the number of unreached data packets and a horizontal axis represents elapsed time. A solid line (normal-all) indicates the number of unreached packets with a normal dimension order routing. A dotted line (onehop-all) indicates the number of unreached data packets when the method of the first embodiment is carried out. A broken line (normal-x) indicates the number of data packets present in the current x axis data transmitting and receiving port with the normal dimension order routing. A large dotted line (onehop-x) indicates the number of data packets present in the x axis data transmitting and receiving port when the method of the first embodiment is carried out. A dashed-dotted line (normal-y) indicates the number of data packets present in the y axis data transmitting and receiving port with the normal dimension order routing. A dashed double-dotted line (onehop-y) indicates the number of data packets present in the y axis data transmitting and receiving port when the method of the first embodiment is carried out.

The following points may be understood based on these results. That is, the peak maximum number of data packets present in the x axis of the entire system decreases but the peak maximum number of data packets present in the y axis increases when the method of the first embodiment is applied. Accordingly, the dimension order routing is efficiently carried out to eventually improve the parallel transmission properties, thereby achieving about 10% reduction in the communication time.

Note that the above simulation is performed based on the two dimensional torus connection configuration for convenience of illustration. However, the technical idea of the first embodiment is obviously effective regardless of types of topology.

According to the disclosures herein, an information processing system including information processing devices multi-dimensionally connected with one another is capable of reducing data transmission waiting time for data transmission by effective utilization of virtual channels.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An information processing system comprising a plurality of information processing devices multi-dimensionally connected with one another, wherein each of the information processing devices includes:
    a first receiving storage device configured to store data allocated to a first virtual channel and a second receiving storage device configured to store data allocated to a second virtual channel in corresponding data transmitting and receiving directions;
    a virtual channel control unit configured to compare a position of a destination information processing device in a dimension in which data is transmitted with a position of an own information processing device in the same dimension, and if the own information processing device is positioned one information processing device before the position of the destination information processing device, change one of the first and the second virtual channels allocated to the corresponding data to the other one of the first and the second virtual channels;
    a data storage unit configured to store the corresponding data allocated to the one of the first and the second virtual channels controlled by the virtual channel control unit in one of the first and second storage devices based on the controlled one of the first and the second virtual channels;
    a transmitting dimension control unit configured to compare the position of the destination information processing device in a dimension in which data is transmitted with the position of the own information processing device in the same dimension, and if the position of the own information processing device matches the position of the destination information processing device, change the dimension in which the corresponding data are transmitted into the other dimension; and
    an arbitration unit configured to perform arbitration between a unit of data stored in the first storage device and a unit of data stored in the second storage device, and determine one of the units of the data to be transmitted in a corresponding one of directions as data to practically be transmitted.

2. The information processing system as claimed in claim 1, wherein if the comparison result obtained by the transmitting dimension control unit indicates that the position of the destination information processing device matches the position of the own information processing device, and if the one of the first and the second virtual channels in which the corresponding data are to be transmitted has already been changed, the virtual channel control unit changes the changed one of the first and the second virtual channels back to the original one.

3. The information processing system as claimed in claim 1, wherein if the position of the own information processing device matches a changed position in the dimension of the corresponding virtual channel in which the data are transmitted, the virtual channel control unit changes the corresponding virtual channel in which the data are transmitted.

4. The information processing system as claimed in claim 1, wherein the plurality of information processing devices are connected in a multi-dimensional torus configuration.

5. A control method for controlling a plurality of information processing devices multi-dimensionally connected with one another in an information processing system, the information processing device including a first receiving storage device configured to store data allocated to a first virtual channel and a second receiving storage device configured to store data allocated to a second virtual channel in corresponding data transmitting and receiving directions, the method comprising:
    comparing a position in a dimension of a destination information processing device with a position in the same dimension of an own information processing device, and if the comparison result indicates that the position of the own information processing device matches a position one information processing device before the position of the destination information processing device, changing one of the first and the second virtual channels allocated to the corresponding data to the other one of the first and the second virtual channels;
    storing the corresponding data allocated to the one of the first and the second virtual channels controlled by the virtual channel control unit in one of the first and second storage devices based on the controlled one of the first and the second virtual channels;
    comparing the position in the dimension of the destination information processing device with the position in the same dimension of the own information processing device, and when the position of the own information processing device matches the position of the destination information processing device, changing the dimension in which the corresponding data are transmitted into a subsequent dimension; and
    performing arbitration between a unit of data stored in the first storage device and a unit of data stored in the second storage device, and determining one of the units of the data to be transmitted in a corresponding one of directions as data to practically be transmitted.

6. The control method for controlling the information processing device as claimed in claim 5, wherein the comparing further includes, when the comparison result obtained in the transmitting dimension control step indicates that the position of the destination information processing device matches the position of the own information processing device, and if the one of the first and the second virtual channels in which the corresponding data are transmitted has already been changed, changing the changed one of the first and the second virtual channels back to the original one.

7. The control method for controlling the information processing device as claimed in claim 5, wherein the comparing further includes, when the position of the own information processing device matches a changed position in the dimension of the corresponding virtual channel in which the data are transmitted, changing the corresponding virtual channel in which the data are transmitted.

8. The control method for controlling the information processing device as claimed in claim 5, wherein in the information processing system, the information processing device is connected to the other information processing devices in a multi-dimensional torus configuration.

9. A computer-readable, non-transitory medium storing a program for controlling a plurality of information processing devices multi-dimensionally connected with one another in an information processing system, the information processing device including a first receiving storage device configured to store data allocated to a first virtual channel and a second receiving storage device configured to store data allocated to a second virtual channel in corresponding data transmitting and receiving directions, the program, when executed by a processor causing a computer to function as:
  a virtual channel control unit configured to compare a position in a dimension of a destination information processing device with a position in the same dimension of an own information processing device, and if the comparison result indicates that the position of the own information processing device matches a position one information processing device before the position of the destination information processing device, change one of the first and the second virtual channels allocated to the corresponding data to the other one of the first and the second virtual channels;
  a data storage unit configured to store the corresponding data allocated to the one of the first and the second virtual channels controlled by the virtual channel control unit in one of the first and second storage devices based on the controlled one of the first and the second virtual channels;
  a transmitting dimension control unit configured to compare the position in the dimension of the destination information processing device with the position in the same dimension of the own information processing device, and if the position of the own information processing device matches the position of the destination information processing device, change the dimension in which the corresponding data are transmitted into a subsequent dimension; and
  an arbitration unit configured to perform arbitration between a unit of data stored in the first storage device and a unit of data stored in the second storage device, and determine one of the units of the data to be transmitted in a corresponding one of directions as data to practically be transmitted.

10. The computer-readable, non-transitory medium storing the program for controlling the information processing devices as claimed in claim 9, wherein if the comparison result obtained by the transmitting dimension control unit indicates that the position of the destination information processing device matches the position of the own information processing device, and if the one of the first and the second virtual channels in which the corresponding data are transmitted has already been changed, the virtual channel control unit changes the changed one of the first and the second virtual channels back to the original one.

11. The computer-readable, non-transitory medium storing the program for controlling the information processing device as claimed in claim 9, wherein if the position of the own information processing device matches a changed position in the dimension of the corresponding virtual channel in which the data are transmitted, the virtual channel control unit changes the corresponding virtual channel in which the data are transmitted.

12. The computer-readable, non-transitory medium storing the program for controlling the information processing device as claimed in claim 9, wherein in the information processing system, the information processing device is connected to the other information processing devices in a multi-dimensional torus configuration.

* * * * *